US007649756B2

(12) United States Patent
Kerkman et al.

(10) Patent No.: US 7,649,756 B2
(45) Date of Patent: Jan. 19, 2010

(54) COMMON MODE NOISE REDUCTION IN CONVERTER SYSTEMS THROUGH MODIFICATION OF SINGLE PHASE SWITCHING SIGNAL

(75) Inventors: Russel J. Kerkman, Milwaukee, WI (US); Qiang Yin, Shanghai (CN); Haihui Lu, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 285 days.

(21) Appl. No.: 11/435,651

(22) Filed: May 17, 2006

(65) Prior Publication Data

US 2007/0268051 A1    Nov. 22, 2007

(51) Int. Cl.
*H02M 1/14* (2006.01)
(52) U.S. Cl. .............................. 363/41; 363/98; 318/811
(58) Field of Classification Search ................... 363/37, 363/39, 40, 41, 132, 98; 318/619, 811, 599, 318/801
See application file for complete search history.

(56) References Cited

U.S. PATENT DOCUMENTS

| | | | |
|---|---|---|---|
| 5,625,550 A | 4/1997 | Leggate et al. | |
| 6,005,362 A * | 12/1999 | Enjeti et al. | 318/479 |
| 6,031,738 A * | 2/2000 | Lipo et al. | 363/37 |
| 6,185,115 B1 * | 2/2001 | Sul et al. | 363/37 |
| 6,469,916 B1 | 10/2002 | Kerkman et al. | |
| 6,477,067 B1 | 11/2002 | Kerkman et al. | |
| 6,653,829 B1 * | 11/2003 | Henry et al. | 324/207.21 |
| 6,750,633 B2 * | 6/2004 | Schreiber | 322/12 |
| 6,819,078 B2 * | 11/2004 | Ho | 318/808 |
| 6,911,801 B2 * | 6/2005 | Youm | 318/801 |
| 7,075,267 B1 * | 7/2006 | Cheng | 318/807 |
| 7,173,832 B2 * | 2/2007 | Wu | 363/40 |
| 7,274,576 B1 * | 9/2007 | Zargari et al. | 363/39 |
| 7,294,989 B2 * | 11/2007 | Saren | 318/805 |
| 2003/0002299 A1 * | 1/2003 | Trzynadlowski et al. | 363/21.1 |
| 2005/0046508 A1 * | 3/2005 | Luukko et al. | 332/109 |
| 2005/0174812 A1 * | 8/2005 | Wu | 363/39 |
| 2006/0138994 A1 * | 6/2006 | Cheng | 318/807 |
| 2007/0211501 A1 * | 9/2007 | Zargari et al. | 363/39 |

* cited by examiner

*Primary Examiner*—Edward Tso
*Assistant Examiner*—Arun Williams
(74) *Attorney, Agent, or Firm*—Quarles & Brady LLP; Alexander R. Kuszewski

(57) ABSTRACT

A method and apparatus for reducing common mode noise in a three phase pulse width modulated (PWM) system, the method comprising the steps of receiving the first, second and third modulating waveforms, identifying one of the modulating waveforms that is at least one of instantaneously the maximum and instantaneously the minimum of the modulating waveforms as a first identified waveform, wherein comparison of the first identified waveform to the carrier signal would generate a first on-off pulse sequence associated with a phase corresponding to the first identified waveform, generating switch control signals associated with the phase corresponding to the first identified waveform that cause a modified on-off pulse sequence that is phase shifted from the first pulse sequence, using the second and third modulating waveforms to generate second and third on-off pulse sequences corresponding to the second and third phases and providing the modified pulse sequence and the second and third pulse sequences to the one of the inverter and the converter.

38 Claims, 23 Drawing Sheets

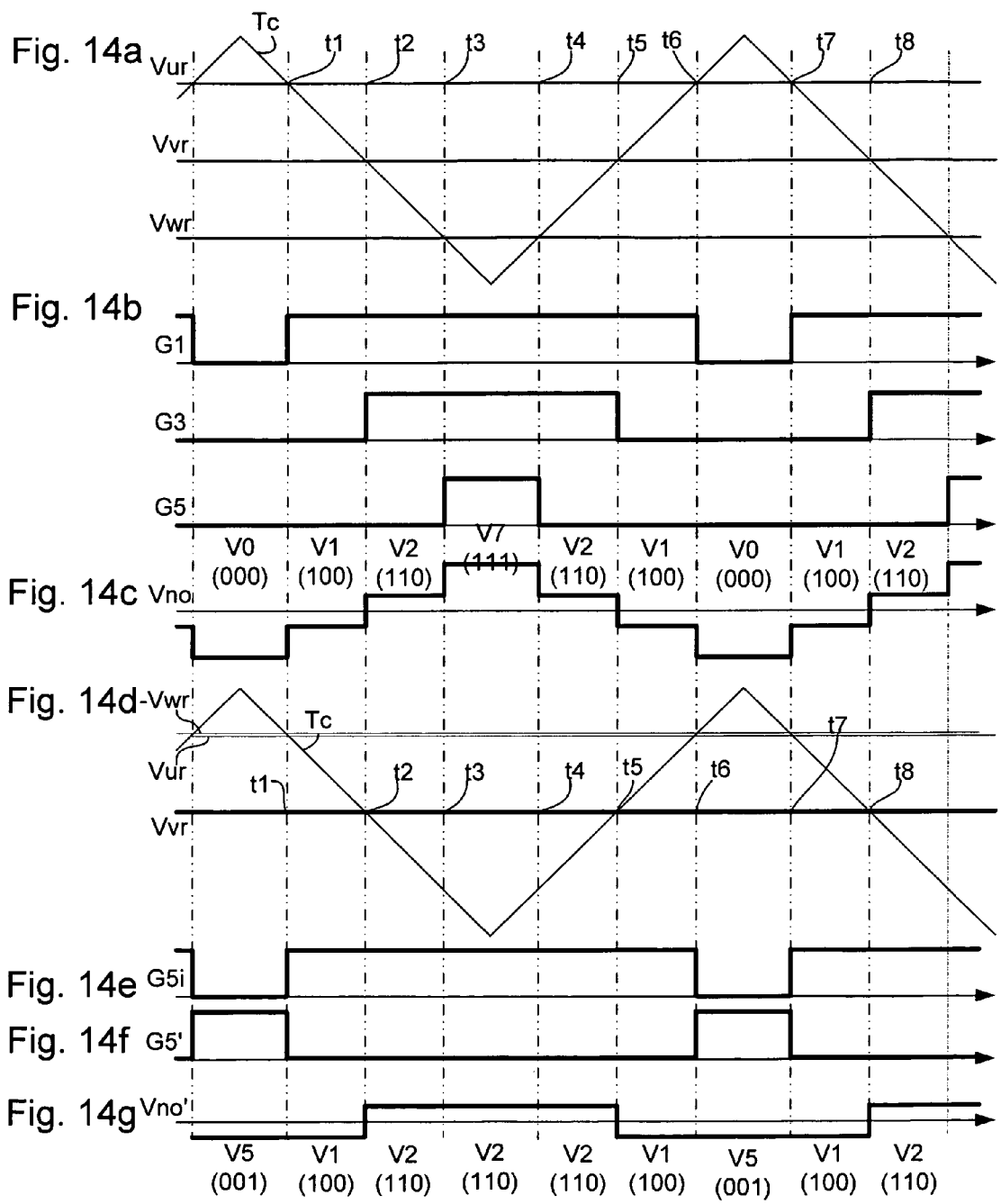

| G3' | Q2Q1Q0 | 1 | 2 | 3 | 4 | 5 | 6 |
|---|---|---|---|---|---|---|---|
| G1G3G5 | | 001 | 010 | 011 | 100 | 101 | 110 |
| V0 | 000 | 0 | 1 | 1 | 0 | 0 | 0 |
| V5 | 001 | 0 | 0 | 0 | 0 | 0 | 0 |
| V3 | 010 | 1 | 1 | 1 | 1 | 1 | 1 |
| V4 | 011 | 1 | 1 | 1 | 1 | 1 | 1 |
| V1 | 100 | 0 | 0 | 0 | 0 | 0 | 0 |
| V6 | 101 | 0 | 0 | 0 | 0 | 0 | 0 |
| V2 | 110 | 1 | 1 | 1 | 1 | 1 | 1 |
| V7 | 111 | 1 | 0 | 0 | 1 | 1 | 1 |

Fig. 17

| G5' | Q2Q1Q0 | 1 | 2 | 3 | 4 | 5 | 6 |
|---|---|---|---|---|---|---|---|
| G1G3G5 | | 001 | 010 | 011 | 100 | 101 | 110 |
| V0 | 000 | 0 | 0 | 0 | 1 | 1 | 0 |
| V5 | 001 | 1 | 1 | 1 | 1 | 1 | 1 |
| V3 | 010 | 0 | 0 | 0 | 0 | 0 | 0 |
| V4 | 011 | 1 | 1 | 1 | 1 | 1 | 1 |
| V1 | 100 | 0 | 0 | 0 | 0 | 0 | 0 |
| V6 | 101 | 1 | 1 | 1 | 1 | 1 | 1 |
| V2 | 110 | 0 | 0 | 0 | 0 | 0 | 0 |
| V7 | 111 | 1 | 1 | 1 | 0 | 0 | 1 |

Fig. 18

| G1' | Q2Q1Q0 | 1 | 2 | 3 | 4 | 5 | 6 |
|---|---|---|---|---|---|---|---|
| G1G3G5 | | 001 | 010 | 011 | 100 | 101 | 110 |
| V0 | 000 | 0 | 0 | 1 | 1 | 0 | 0 |
| V5 | 001 | 0 | 0 | 0 | 0 | 0 | 0 |
| V3 | 010 | 0 | 0 | 0 | 0 | 0 | 0 |
| V4 | 011 | 0 | 0 | 0 | 0 | 0 | 0 |
| V1 | 100 | 1 | 1 | 1 | 1 | 1 | 1 |
| V6 | 101 | 1 | 1 | 1 | 1 | 1 | 1 |
| V2 | 110 | 1 | 1 | 1 | 1 | 1 | 1 |
| V7 | 111 | 1 | 1 | 0 | 0 | 1 | 1 |

Fig. 19

| G3' | Q2Q1Q0 | 1 | 2 | 3 | 4 | 5 | 6 |
|---|---|---|---|---|---|---|---|
| G1G3G5 | | 001 | 010 | 011 | 100 | 101 | 110 |
| V0 | 000 | 0 | 0 | 0 | 0 | 1 | 1 |
| V5 | 001 | 0 | 0 | 0 | 0 | 0 | 0 |
| V3 | 010 | 1 | 1 | 1 | 1 | 1 | 1 |
| V4 | 011 | 1 | 1 | 1 | 1 | 1 | 1 |
| V1 | 100 | 0 | 0 | 0 | 0 | 0 | 0 |
| V6 | 101 | 0 | 0 | 0 | 0 | 0 | 0 |
| V2 | 110 | 1 | 1 | 1 | 1 | 1 | 1 |
| V7 | 111 | 1 | 1 | 1 | 1 | 0 | 0 |

Fig. 20

| G5' | Q2Q1Q0 | 1 | 2 | 3 | 4 | 5 | 6 |
|---|---|---|---|---|---|---|---|
| G1G3G5 | | 001 | 010 | 011 | 100 | 101 | 110 |
| V0 | 000 | 1 | 1 | 0 | 0 | 0 | 0 |
| V5 | 001 | 1 | 1 | 1 | 1 | 1 | 1 |
| V3 | 010 | 0 | 0 | 0 | 0 | 0 | 0 |
| V4 | 011 | 1 | 1 | 1 | 1 | 1 | 1 |
| V1 | 100 | 0 | 0 | 0 | 0 | 0 | 0 |
| V6 | 101 | 1 | 1 | 1 | 1 | 1 | 1 |
| V2 | 110 | 0 | 0 | 0 | 0 | 0 | 0 |
| V7 | 111 | 0 | 0 | 1 | 1 | 1 | 1 |

Fig. 21

COMMON MODE NOISE REDUCTION IN CONVERTER SYSTEMS THROUGH MODIFICATION OF SINGLE PHASE SWITCHING SIGNAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to methodologies for reducing the common mode noises generated by two-level rectifier/inverter variable frequency drive (VFD) systems. This invention more particularly relates to modulation techniques for common mode noise reduction.

Referring to FIG. 1, an exemplary two-level rectifier/inverter variable frequency drive (VFD) system is shown that includes a three phase voltage source, a rectifier, a three phase inverter and a load (e.g., a motor). The rectifier may be either a diode type (i.e., constructed using diodes) or an active type (i.e., a boost type including controllable switching devices that is controlled via pulse width modulation (PWM) or the like). Where the rectifier is active, the rectifier typically includes six switching devices (e.g., solid state semiconductor-based switching elements such as silicon-controlled rectifiers (SCRs), gate turn-off thyristors (GTOs), gate commutated thyristors (GCTs), insulated gate bipolar transistors (IGBTs)) that convert three phase input power to DC voltage across the two lines that connect the rectifier to the inverter.

In a three phase system the inverter typically includes six switching devices that link the DC lines to the three phase load. By switching the inverter switches on and off, the three phases of the load are linked to the positive and negative DC lines. By switching the inverter switches in a controlled fashion, the voltages and currents on the lines linked to the load can be controlled so that variable frequency power is delivered to the load.

To generate switch control signals, many systems employ pulse PWM techniques where modulating waveforms (e.g., sinusoidal or other) are generated for each system phase and are compared to high frequency carrier signals (e.g., often thought of as high frequency saw tooth waveforms). Based on the comparisons, switch control signals are generated that turn the active rectifier and inverter switches on and off. Several PWM schemes are commonly employed and are well known in the drives industry including space vector PWM (SVPWM) and discontinuous PWM (DPWM), where the different schemes employ differently shaped modulating waveforms.

Referring to FIG. 2, a PWM diagram is illustrated that includes eight different vectors V0, V1, V2, V3, V4, V5, V6 and V7 where each vector is associated with a unique switching state of the top three switches (e.g., G1, G3 and G5) in the inverter of FIG. 1 where a "1" indicates that an associated switch is closed or on and a "0" indicates that an associated switch is open or off. For instance, for vector V1, the (100) label indicates that switches G1, G3 and G5 are on, off and off, respectively. The bottom switch states are the inverse of the top switch states. For instance, when the state of switch G1 is "1" (i.e., on), the state of associated bottom switch G2 is "0" (i.e., off).

As well known in the drives industry, as the switches of either an active rectifier or an inverter are turned on and off, under certain circumstances, common-mode voltages (CMVs) are generated that appear in the output phases of the motor drive and hence on the motor windings. CMV pulses cause CMV dv/dts which in turn cause common mode current (CMC) spikes. The number of CMC spikes is equal to the number of CMV dv/dt steps. Referring still to FIG. 1, the CMV appears between the neutral point "n" of the motor windings and ground "g". CMV and associated CMC have been known to reach levels beyond motor winding insulation ratings and can result in undesirable bearing currents. Consequently, CMV and CMC often reduce system performance at a minimum and have been known to damage motor components.

Referring again to FIG. 1, CMV can be expressed by the following equations:

$$CMV = V_{ng} = V_{no} + V_{og} \qquad \text{Eq. 1}$$

$$V_{no} = (V_{uo} + V_{vo} + V_{wo})/3 \qquad \text{Eq. 2}$$

$$V_{og} = -(V_{ao} + V_{bo} + V_{co})/3 \qquad \text{Eq. 3}$$

As to diode rectifier/inverter systems, the frequency and amplitude of voltage $V_{og}$ is determined by the frequency of the power supply linked to the front end of the converter. For instance, where the AC power supply provides 60 Hz power, the three phase rectifier generates voltage $V_{og}$ having a positive 180 Hz ripple waveform and a negative 180 Hz ripple waveform and therefore the CMV likewise has a 180 Hz ripple.

Another portion of the CMV in a diode rectifier/inverter system, the $V_{no}$ portion, is related to or caused by inverter modulation and has amplitudes as shown in Table 1 where the vectors (i.e., V0, V1, V2, etc.) are space vectors as shown in FIG. 2.

TABLE 1

| Vector | State (G1, G3, G5) | $V_{uo}$ | $V_{vo}$ | $V_{wo}$ | $V_{no}$ |
|---|---|---|---|---|---|
| $V_0$ | (0, 0, 0) | $-V_{dc}/2$ | $-V_{dc}/2$ | $-V_{dc}/2$ | $-V_{dc}/2$ |
| $V_1$ | (1, 0, 0) | $V_{dc}/2$ | $-V_{dc}/2$ | $-V_{dc}/2$ | $-V_{dc}/6$ |
| $V_2$ | (1, 1, 0) | $V_{dc}/2$ | $V_{dc}/2$ | $-V_{dc}/2$ | $V_{dc}/6$ |
| $V_3$ | (0, 1, 0) | $-V_{dc}/2$ | $V_{dc}/2$ | $-V_{dc}/2$ | $-V_{dc}/6$ |
| $V_4$ | (0, 1, 1) | $-V_{dc}/2$ | $V_{dc}/2$ | $V_{dc}/2$ | $V_{dc}/6$ |
| $V_5$ | (0, 0, 1) | $-V_{dc}/2$ | $-V_{dc}/2$ | $V_{dc}/2$ | $-V_{dc}/6$ |
| $V_6$ | (1, 0, 1) | $V_{dc}/2$ | $-V_{dc}/2$ | $V_{dc}/2$ | $V_{dc}/6$ |
| $V_7$ | (1, 1, 1) | $V_{dc}/2$ | $V_{dc}/2$ | $V_{dc}/2$ | $V_{dc}/2$ |

According to table 1, instantaneous values of voltage $V_{no}$ can be expressed as:

$$V_{no} = \begin{cases} \pm \dfrac{V_{dc}}{2} & \text{for } V_0 \text{ and } V_7 \\ \pm \dfrac{V_{dc}}{6} & \text{for other states} \end{cases} \qquad \text{Eq. 4}$$

Referring to FIG. 3, a CMV (Vno) waveform and an associated CMC waveform are illustrated that result during one switching period when standard SVPWM control is employed. As shown, at each of times t1, t2, t3, t4, t5 and t6 a dv/dt occurs which results in current spikes ands the peak to peak value of the CMV is Vdc. FIG. 4 shows an FFT spectrum plot of CMC corresponding to FIG. 3. FIGS. 5 and 6 include plots similar to those shown in FIGS. 3 and 4, respectively, albeit where DPWM was employed instead of SVPWM.

In an attempt to reduce CMV and CMC, some modified modulators for diode rectifier/inverter systems have been developed that modify inverter switching patterns so that zero switching states (V0 and V7) are virtually (as opposed to actually) created by using two active vectors that are 180 degree out of phase. By virtually creating the zero switching states the peak-to-peak amplitude of the CMV can be significantly reduced. These modified modulators are based on direct-digital SVPWM where dwell-times must be calculated in real-time for optimal performance.

As to active rectifier/inverter systems, there are eight available output voltage vectors ($V_0$-$V_7$) for both the boost rectifier and inverter according to the eight different switching states depicted in FIG. 2. The possible CMV states for the various output voltage vectors of an active rectifier/inverter system are summarized in Table 2.

TABLE 2

| | | Inverter Output Voltage Vector | | | |
|---|---|---|---|---|---|
| | | $V_1, V_3,$ $V_5$ | $V_2, V_4,$ $V_6$ | $V_0$ | $V_7$ |
| Boost Rectifier Output Voltage Vector | $V_1, V_3, V_5$ | 0 | $V_{dc}/3$ | $-V_{dc}/3$ | $2V_{dc}/3$ |
| | $V_2, V_4, V_6$ | $-V_{dc}/3$ | 0 | $-2V_{dc}/3$ | $V_{dc}/3$ |
| | $V_0$ | $V_{dc}/3$ | $2V_{dc}/3$ | 0 | $V_{dc}$ |
| | $V_7$ | $-2V_{dc}/3$ | $-V_{dc}/3$ | $-V_{dc}$ | 0 |

In case of an asynchronous switching sequence or a different switching frequency between the boost rectifier and inverter, a CMV with peak-to-peak amplitude of $2V_{dc}$ can occur.

Nevertheless, it is well know that the CMV peak-to-peak amplitude generated by boost rectifier/inverter systems can be restricted to be no more than $1.33V_{dc}$ by synchronizing the switching sequence between the rectifier and inverter stages of the system. Unfortunately synchronization of the switching sequences is not easy to facilitate when the switching frequency of the boost rectifier is different than the frequency of the inverter.

Some modified modulators for active rectifier/inverter systems have been developed that can further reduce the number of CMV pulses in a three-phase system where synchronized switching is realized. In at least some schemes it is possible to eliminate one CMV pulse in every switching period by shifting the active voltage vectors of the inverter to align with those of the boost rectifier. Compared with the conventional three-phase SVPWM scheme, this proposed method can reduce the total number of CMV pulses by one-third.

Unfortunately, this vector shifting SVPWM control scheme cannot be applied to diode rectifier/inverter systems. Where this control scheme is used with an active rectifier/inverter system, for optimal performance, the dwell-time must be calculated in real-time to shift the active voltage vectors and the shifts should be performed in every switching period. Calculating dwell times in real time requires excessive dedicated computing power.

Therefore, it would be advantageous to have a system wherein common mode voltages can be reduced in rectifier/inverter systems generally without requiring dwell time calculations.

BRIEF SUMMARY OF THE INVENTION

At least some inventive embodiments include a method for reducing common mode noise in a three phase pulse width modulated (PWM) system that includes a three phase waveform generator that generates first, second and third modulating waveforms, a carrier signal generator and a PWM generator that compares modulating waveforms and the carrier signal to generate switch control signals for controlling at least one of converter and inverter switches, the method comprising the steps of receiving the first, second and third modulating waveforms, identifying one of the modulating waveforms that is at least one of instantaneously the maximum and instantaneously the minimum of the modulating waveforms as a first identified waveform, wherein comparison of the first identified waveform to the carrier signal would generate a first on-off pulse sequence associated with a phase corresponding to the first identified waveform, generating switch control signals associated with the phase corresponding to the first identified waveform that cause a modified on-off pulse sequence that is phase shifted from the first pulse sequence, using the second and third modulating waveforms to generate second and third on-off pulse sequences corresponding to the second and third phases and providing the modified pulse sequence and the second and third pulse sequences to the one of the inverter and the converter.

Other embodiments include a method for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V0 and V7 wherein each of the upper switches are on to link the three phases to the positive DC rail and where each of the lower switches are on to link the three phases to the negative DC rail, the method comprising the steps of receiving the first, second and third modulating waveforms, identifying the instantaneous maximum modulating waveforms as a first identified waveform, whenever the first, second and third modulating waveforms would result in a zero vector V0, generating switch control signals for the phase associated with the first identified waveform to connect the phase to the positive DC link and whenever the first, second and third modulating waveforms would result in a zero vector V7, generating switch control signals for the phase associated with the first identified waveform to connect the phase to the negative DC link.

Still other embodiments include a method for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V0 and V7 wherein each of the upper switches are on to link the three phases to the positive DC rail and where each of the lower switches are on to link the three phases to the negative DC rail, the method comprising the steps of receiving the first, second and third modulating waveforms, identifying the instantaneous minimum modulating waveforms as a first identified waveform, whenever the first, second and third modulating waveforms would result in a zero vector V0, generating switch control signals for the phase associated with the first identified waveform to connect the phase to the positive DC link and whenever the first, second and third modulating waveforms would result in a zero vector V7, generating switch control signals for the phase associated with the first identified waveform to connect the phase to the negative DC link.

Some embodiments include an apparatus for reducing common mode noise in a three phase pulse width modulated (PWM) system that includes a three phase waveform generator that generates first, second and third modulating waveforms and at least one of a converter and an inverter, the apparatus comprising a processor programmed to receive the first, second and third modulating waveforms, identify one of the modulating waveforms that is at least one of instantaneously the maximum and instantaneously the minimum of the modulating waveforms as a first identified waveform, wherein comparison of the first identified waveform to the carrier signal would generate a first on-off pulse sequence associated with a phase corresponding to the first identified waveform, generate switch control signals associated with the phase corresponding to the first identified waveform that cause a modified on-off pulse sequence that is phase shifted from the first pulse sequence, use the second and third modulating waveforms to generate second and third on-off pulse sequences corresponding to the second and third phases and provide the modified pulse sequence and the second and third pulse sequences to the one of the inverter and the converter.

Still other embodiments include an apparatus for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V0 and V7 wherein each of the upper switches are on to link the three phases to the positive DC rail and where each of the lower switches are on to link the three phases to the negative DC rail, the apparatus comprising a processor programmed to receive the first, second and third modulating waveforms, identify the instantaneous maximum modulating waveforms as a first identified waveform, whenever the first, second and third modulating waveforms would result in a zero vector V0, generate switch control signals for the phase associated with the first identified waveform to connect the phase to the positive DC link and whenever the first, second and third modulating waveforms would result in a zero vector V7, generate switch control signals for the phase associated with the first identified waveform to connect the phase to the negative DC link.

Some embodiments include an apparatus for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V0 and V7 wherein each of the upper switches are on to link the three phases to the positive DC rail and where each of the lower switches are on to link the three phases to the negative DC rail, the apparatus comprising a processor programmed to receive the first, second and third modulating waveforms, identify the instantaneous minimum modulating waveforms as a first identified waveform, whenever the first, second and third modulating waveforms would result in a zero vector V0, generate switch control signals for the phase associated with the first identified waveform to connect the phase to the positive DC link and whenever the first, second and third modulating waveforms would result in a zero vector V7, generate switch control signals for the phase associated with the first identified waveform to connect the phase to the negative DC link.

Still other embodiments include an apparatus for reducing common mode noise in a three phase pulse width modulated (PWM) system that includes at least one of a converter and an inverter that includes first, second and third upper switching devices and first, second and third lower switching devices, a three phase waveform generator that generates first, second and third modulating waveforms and a PWM generator that uses the modulating waveforms to generate switch control signals for controlling the upper and lower switches, the PWM system operating in a first sector when the first modulating waveform is maximum and the third modulating waveform is minimum, operating in a second sector when the second modulating waveform is maximum and the third modulating waveform is minimum, operating in a third sector when the second modulating waveform is maximum and the first modulating waveform is minimum, operating in a fourth sector when the third modulating waveform is maximum and the first modulating waveform is minimum, operating in a fourth sector when the third modulating waveform is maximum and the first modulating waveform is minimum, operating in a fifth sector when the third modulating waveform is maximum and the second modulating waveform is minimum and operating in a sixth sector when the first modulating waveform is maximum and the second modulating waveform is minimum, the apparatus comprising a processor programmed to perform the steps of: receiving the first, second and third modulating waveforms, identifying the instantaneous operating sector, generate initial control signals by comparing the modulating waveforms to the carrier signal, modifying the control signals as a function of the instantaneous operating sector to generate modified control signals and using the modified carrier signals to control the one of the inverter and the converter.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 7a is a graph illustrating an exemplary carrier signal and three modulating waveforms;

FIG. 7b includes three pulse trains, a separate pulse train corresponding to each of the modulating waveforms in FIG. 7a;

FIG. 7c illustrates a common mode voltage that results when the pulse trains of FIG. 7b are used to control the inverter of FIG. 1;

FIG. 7d illustrates an exemplary carrier signal, two unmodified modulating waveforms and one modified modulating waveform that is consistent with at least one inventive embodiment;

FIG. 7e illustrates a pulse train that is associated with the modified modulating waveform of FIG. 7d;

FIG. 7f illustrates a common mode voltage that results when the modified pulse train of FIG. 7e and two of the unmodified pulse trains of FIG. 7b are used to drive or control the inverter of FIG. 7;

FIG. 7g is similar to FIG. 7d, albeit showing two unmodified modulating waveforms and one other modified modulating waveform;

FIG. 7h is similar to FIG. 7e, albeit illustrating a pulse train corresponding to the modified modulating waveform of FIG. 7g;

FIG. 7i is similar to FIG. 7f, albeit corresponding to two unmodified pulse trains of FIG. 7b and the modified pulse train of FIG. 7h;

FIGS. 14a-14g are similar to FIGS. 10a-10g, albeit corresponding to a method including a sub process shown in FIG. 13;

FIG. 17 is similar to FIG. 16, albeit for a switch control signal G3';

FIG. 18 is similar to FIG. 16, albeit for a switch control signal G5';

FIGS. 19-21 are similar to FIGS. 16-18, albeit showing information for developing equations to implement the sub-process of FIG. 9 instead of the process of FIG. 8;

FIG. 22b is similar to FIG. 4, albeit corresponding to the current illustrated in FIG. 22a;

DETAILED DESCRIPTION OF THE INVENTION

The common mode noise reduction schemes described herein are to be used with carrier-based PWM control systems and do not require dwell-time calculations. The schemes can be applied to active rectifiers as well as PWM inverters to reduce common mode noise which includes both CMV and CMC.

Herein three different schemes are disclosed that each have substantially identical results and that are to be employed under different circumstances. To this end, it has been recognized that some drives are programmable off the shelf to generate switch trigger patterns or control signals required to reduce common mode noise completely in software while others require additional hardware. The first scheme described herein is implemented completely in software that is run on an off the shelf drive, the second scheme is implemented in part in software run by a standard drive and in part by additional hardware and the third scheme is implemented in hardware that is added to a standard drive.

Each of the three schemes generates three phase switch control signals where the on-off duty cycles are identical to those generated via SVPWM, DPWM or some other conventional PWM control scheme but where the phase voltages are shifted or distributed differently so that common mode noise is reduced. The first and second schemes operate to alter modulating waveforms while the third scheme operates to modify switch control signals. Hereinafter the first, second and third noise reducing schemes will be referred to as a "max-min scheme", an "inverting scheme" and a "control signal modifying scheme" and will be described separately. For each of the three schemes there are several ways to implement the schemes and examples of each are described below.

A. Max-Min Scheme

Figure 1:
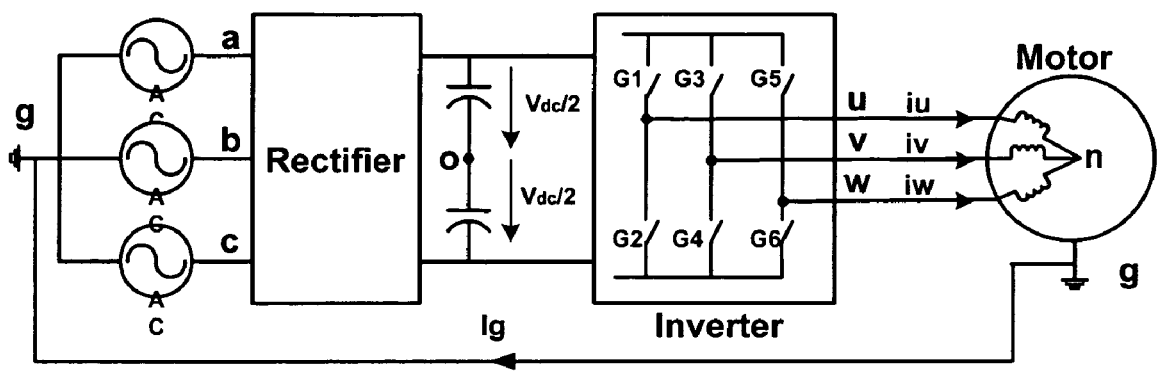
FIG. 1 is a schematic diagram of an exemplary rectifier/inverter system for feeding three-phase power to a motor load.
Figure 7:
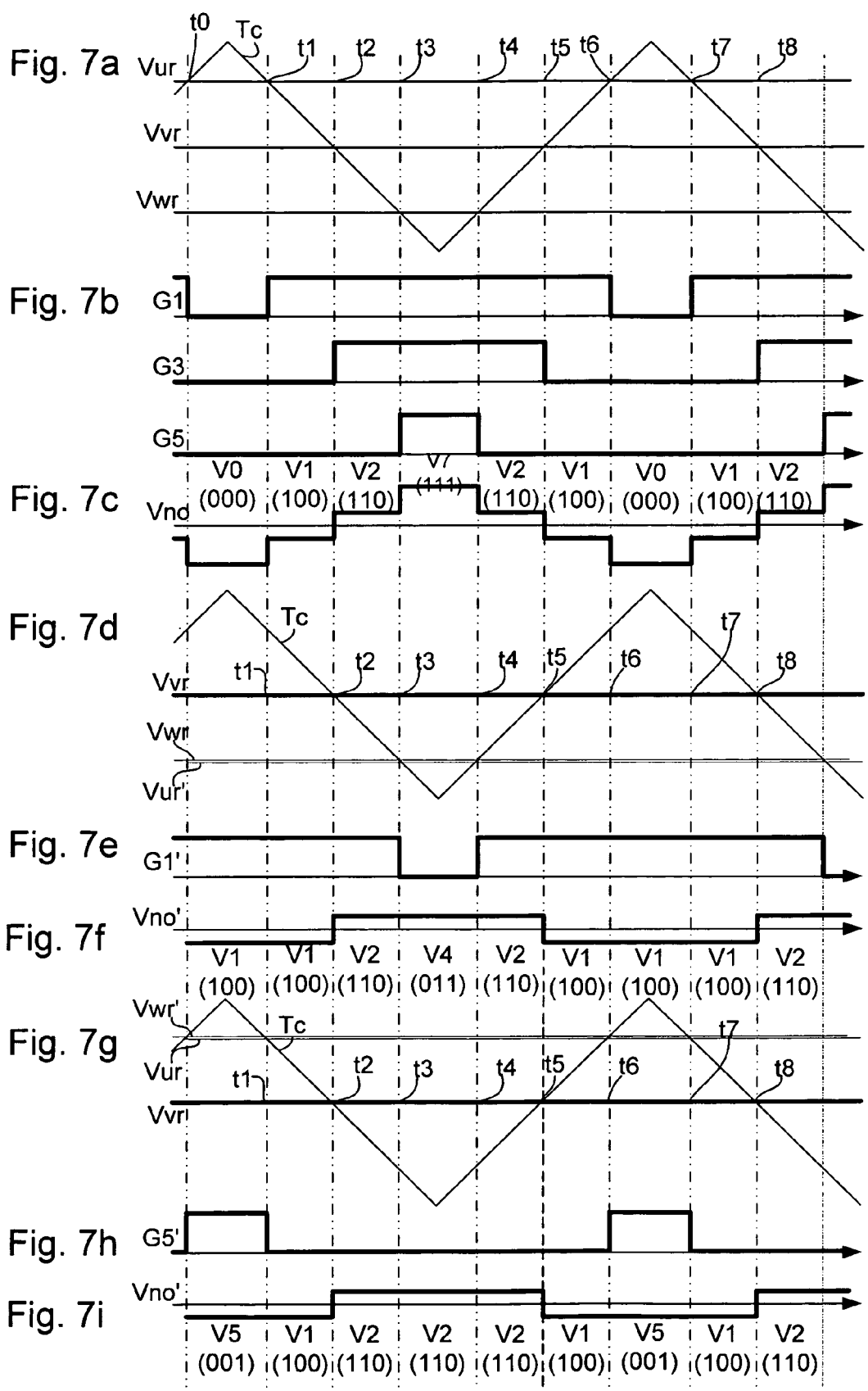

Referring to the FIG. 7 series of figures, several graphs are used to illustrate carrier signals, three phase modulating waveforms, switch control signals that result from comparison of the carrier signals and modulating waveforms and resulting voltages Vno, Vno'. etc. Signal Tc is an exemplary high frequency carrier signal and Vur, Vvr and Vwr are exemplary three phase modulating waveforms (only small segments of the modulating waveforms are shown so the waveforms appear to be horizontal line segments). Signals G1, G3 and G5 correspond to switches having the same labels in FIG. 1 and correspond to modulating waveforms Vur, Vvr and Vwr, respectively. When a switch signal is high, a corresponding switch is turned on and when a switch signal is low a corresponding switch is turned off.

As illustrated in FIGS. 7a and 7b, when a PWM generator is set up to operate according to "active high" rules, when one of the modulating waveforms is above the carrier signal Tc, the corresponding switch signal is high and when the modulating waveform is below the carrier signal Tc the corresponding switch signal is low. Thus, for instance, immediately prior to time t1, because waveform Vur is below signal Tc, signal G1 is low, between times t1 and t6, waveform Vur is above signal Tc and signal G1 is high, between times t6 and t7 waveform Vur is again below signal Tc and signal G1 is low, and so on. Similarly, immediately prior to time t2 and between times t5 and t8 signal G3 is low and between times t2 and t5 and immediately after time t8 signal G3 is high, immediately before time t3 and immediately after time t4, signal G5 is low and between times t3 and t4, signal G5 is high.

At least some PWM generators are also able to be set up to operate according to "active low" rules where a control signal is high when an associated modulating waveform is below a carrier signal Tc and the control signal is low when the associated modulating waveform is above the carrier signal.

Referring still to FIG. 7b and also FIG. 7c, signals G1, G3 and G5 correspond to conventional drive operation and result in a common mode voltage component Vno as illustrated that includes six dv/dts per carrier cycle where a separate dv/dt occurs each time one of the modulating waveforms Vur, Vvr or Vwr intersects the carrier signal Tc (i.e., a separate dv/dt occurs at least of times t1, t2, t3, t4, t5 and t6 during the full carrier cycle illustrated in FIG. 7).

According to the inventive max-min scheme, after modulating waveforms Vur, Vvr and Vwr are generated, a processor identifies the instantaneous maximum and minimum values of the three waveforms and alters one of the maximum and minimum modulating waveforms to generate a modified modulating waveform by either setting the maximum value equal to the minimum value or setting the minimum value equal to the maximum value. Thereafter, the PWM generator set up is changed for the phase corresponding to the modified modulating waveform only. For instance, if the PWM generator was initially or is normally set up to operate according to active high rules, the generator is set to operate according to active low rules for the phase corresponding to the modified modulating waveform and if the PWM generator was initially or is normally set up to operate according to active low rules, the generator is set to operate according to active high rules for the phase corresponding to the modified modulating waveform. For the two unmodified modulating waveforms the PWM generator set up is unchanged.

The PWM generator compares the modulating waveform to the carrier signal Tc using the modified PWM generator set up rules and compares the other two unmodified modulating waveforms to the carrier signal Tc using the initial or original PWM generator set up rules and generates switch control signals that are used to drive the inverter.

Figure 8:
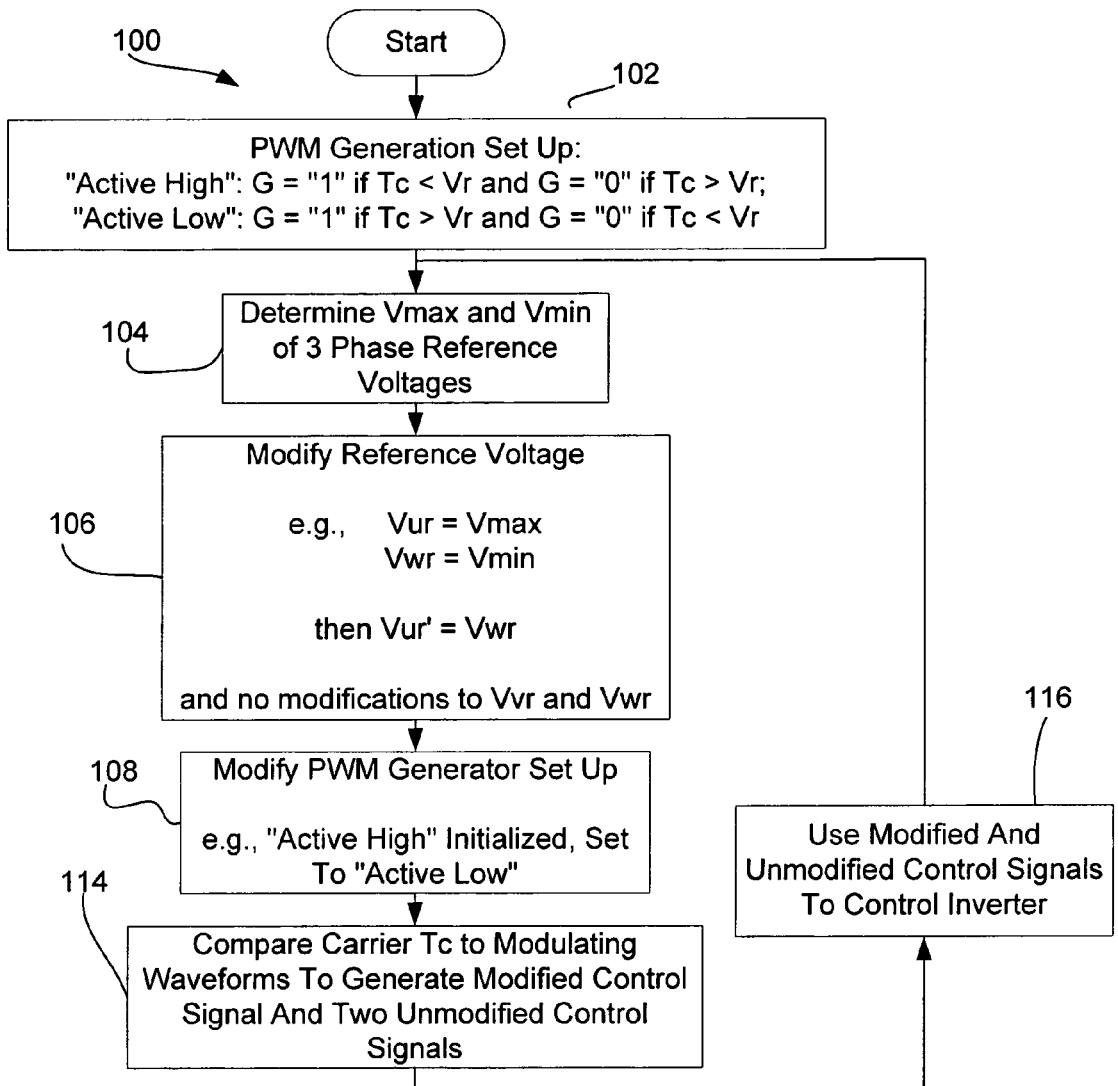
FIG. 8 is a flow chart illustrating one method for modifying modulating waveforms that is consistent with FIGS. 7d-7f.

Referring to FIG. 8, a first exemplary method 100 consistent with one embodiment of the max-min scheme is illustrated. At block 102, the PWM generator rules are set to either active high or active low. Here it will be assumed that the rules are set to active high. At block 104, a drive processor identifies the maximum Vmax and minimum Vmin of the three phase voltages Vur, Vvr and Vwr. Referring also to FIG. 7a, in the illustrated example, the instantaneous maximum and minimum voltages are Vur and Vwr, respectively, and therefore instantaneous operation of the system is in the first sector S1 (see again FIG. 2). At block 106 the processor modifies one of the modulating waveforms by setting the maximum phase waveform equal to the minimum phase waveform. For instance, referring again to FIG. 7a, because Vur is the maximum and Vwr is the minimum, at block 106, Vur is set equal to Vwr. In FIG. 7d, a modified waveform Vur' is illustrated just below waveform Vwr to indicate equality.

Continuing, at block 108, PWM generator set up is modified for the u phase which corresponds to the modified modulating waveform Vur'. In the present example, because the PWM generator was initially set up to operate according to active high rules, the set up for the u phase is modified so that the generator operates according to active low rules for the u phase. At block 114, the modulating waveforms including the modified waveform Vur' and the unmodified waveforms Vvr and Vwr are provided to the PWM generator ands used to generate switch control signals.

Referring to FIGS. 7b and 7e, the resulting switch signals in the present example include signals G3 and G5 in FIG. 7b and modified switch signal G1' in FIG. 7e. When signals G1', G3 and G5 and complimentary signals G2, G4 and G6 (not illustrated) are used to drive the inverter of FIG. 1, voltage Vno' illustrated in FIG. 7f results. As shown, voltage Vno' has only two dv/dts per carrier cycle and the peak value is less than in FIG. 7c and therefore CMC is substantially reduced.

Figure 2:
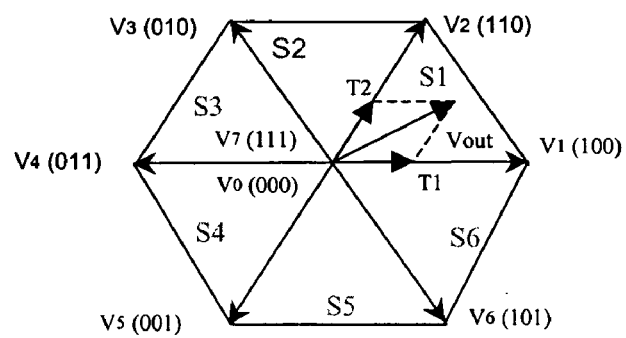
FIG. 2 is a phase diagram illustrating various vectors and associated sectors corresponding to switch states for the switches of the inverter shown in FIG. 1.

During other periods of system operation, others of the waveforms Vur, Vvr and Vwr will be maximum and minimum so that instantaneous operation of the system cycles through each of the sectors S1 through S6 as illustrated in FIG. 2 and therefore which waveform is modified will change during modulating waveform cycles and similarly which phase of the PWM generator has a modified set up will change. For instance, while Vur>Vvr>Vwr during sector 1 operation, Vvr>Vur>Vwr during sector 2 operation, Vvr>Vwr>Vur during sector 3 operation, and so on, and therefore which waveform is modified depends on the instantaneous sector of operation.

Referring again to FIGS. 7b and 7e, it should be appreciated that the average duty cycle (i.e., on to off durations) of the modified switch control signal G1' is identical to the average duty cycle of the original control signal G1, the only difference between the two signals G1 and G1' being that the on and off times have been shifted. More specifically, signal G1' has been shifted so that off periods align with on periods of signal G5 and therefore, as seen by comparing FIGS. 7c and 7f, dv/dts at times t0, t1, t3, t4, t6, t7, etc., are eliminated so that the peak value of Vno' is reduced when compared to the peak value of Vno.

Figure 9:
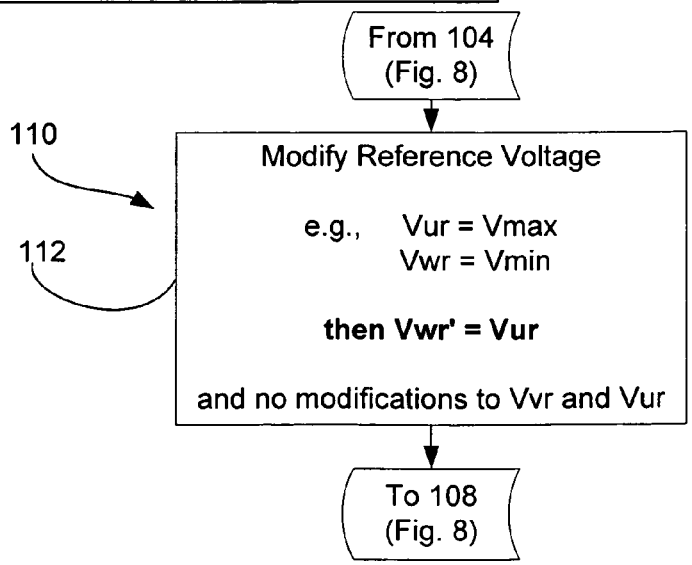
FIG. 9 is a sub process that may be substituted for a portion of the process of FIG. 8 and that corresponds to FIGS. 7g-7i.

Referring to FIG. 9, a subprocess that may be used to replace step 106 in FIG. 8 is illustrated where, instead of replacing the maximum modulating waveform with the minimum, the minimum waveform is replaced with the maximum. Referring also to FIG. 8, after block 104 control may pass to block 112 in FIG. 9. Referring also to FIG. 7a, in the illustrated example, the instantaneous maximum and minimum voltages are Vur and Vwr, respectively. At block 112 the processor modifies one of the modulating waveforms by setting the minimum phase waveform equal to the maximum phase waveform. For instance, referring again to FIG. 7a, because Vur is the maximum and Vwr is the minimum, at block 112, Vwr is set equal to Vur. In FIG. 7g, a modified waveform Vwr' is illustrated just above waveform Vur to indicate equality.

Continuing, control passes back to block 108 in FIG. 8 where PWM generator set up is modified for the w phase which corresponds to the modified modulating waveform Vwr'. In the present example, because the PWM generator was initially set up to operate according to active high rules, the set up for the w phase is modified so that the generator operates according to active low rules for the w phase. At block 114, the modulating waveforms including the modified waveform Vwr' and the unmodified waveforms Vur and Vvr are provided to the PWM generator ands used to generate switch control signals.

Referring to FIGS. 7b and 7h, the resulting switch signals in the present example include signals G1 and G3 in FIG. 7b and modified switch signal G5' in FIG. 7h. When signals G1, G3 and G5' and complimentary signals G2, G4 and G6 (not illustrated) are used to drive the inverter of FIG. 1, voltage Vno' illustrated in FIG. 7i results. As shown, voltage Vno' has only two dv/dts per carrier cycle and the peak value is less than in FIG. 7c and therefore CMC is substantially reduced. In short, the results using this second max-min method are identical to the results that occur when using the first method corresponding to FIGS. 7e and 7f.

B. Inverting Scheme

Figure 10:
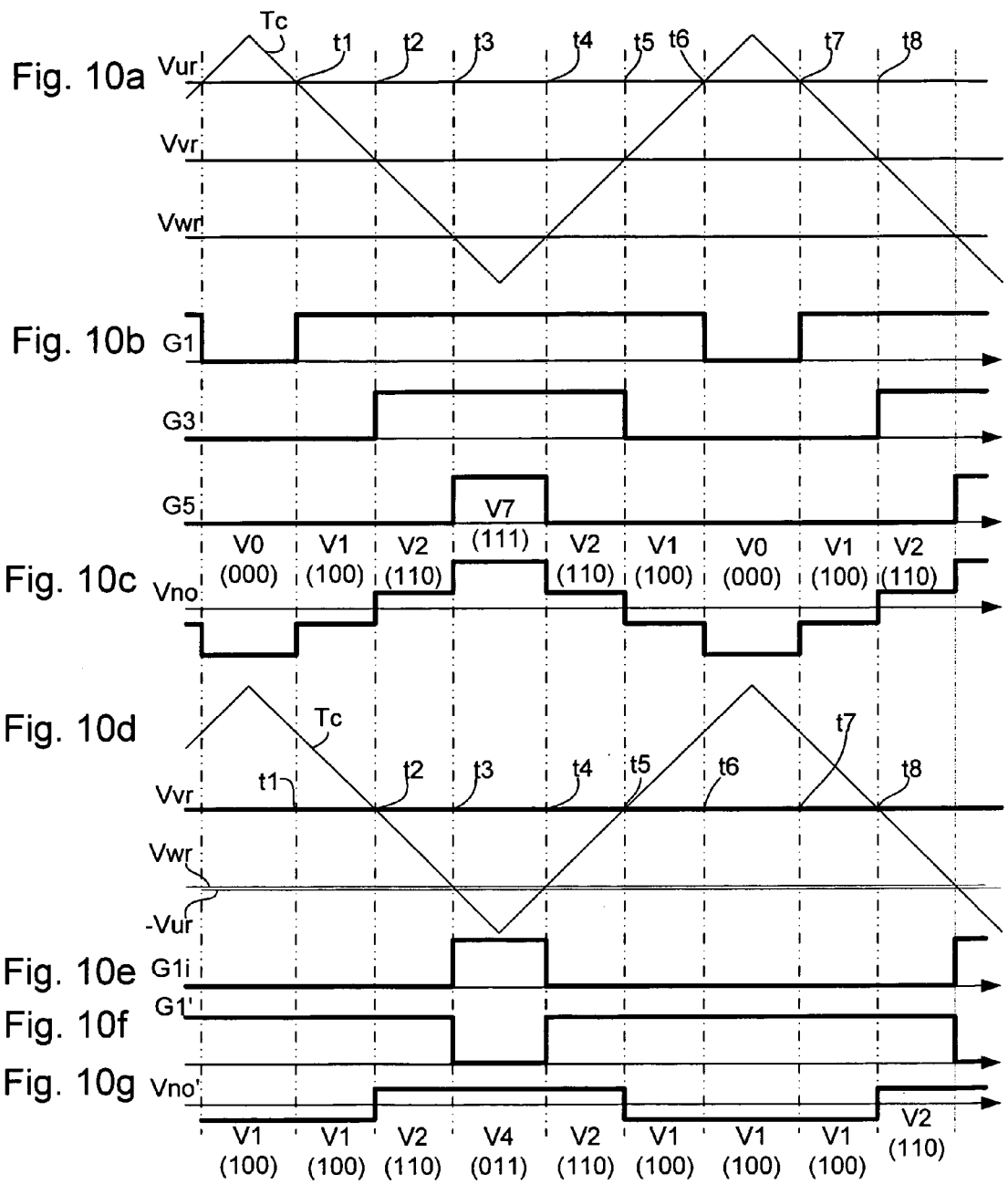
FIGS. 10a, 10b and 10c are identical to FIGS. 7a, 7b and 7c, respectively.
FIG. 10d is similar to FIG. 7d, albeit illustrating two unmodified modulating waveforms and one modified modulating waveform that is modified in a manner different than that in FIG. 7d.
FIG. 10e illustrates a pulse sequence associated with the modified modulating waveform of FIG. 10d.
FIG. 10f illustrates the pulse sequence of FIG. 10e inverted.
FIG. 10g is similar to FIG. 7i, albeit illustrating a common mode voltage that results from using the pulse sequence of FIG. 10f and two unmodified pulse sequences of FIG. 10b to control the inverter of FIG. 1.

Referring to the FIG. 10 series of figures, several graphs are used to illustrate carrier signals Tc, three phase modulating waveforms Vur, Vvr, Vwr, etc., switch control signals G1, G3, G5, etc., that result from comparison of the carrier signals and modulating waveforms and resulting voltages Vno, Vno'. etc., that are akin to similar signals and waveforms shown in the FIG. 7 series of figures. Here it will be assumed that a PWM generator is set to operate according to active high rules so that when one of the modulating waveforms is above the carrier signal Tc, the corresponding switch signal is high and when the modulating waveform is below the carrier signal Tc the corresponding switch signal is low.

Referring still to FIG. 10b and also FIG. 10c, signals G1, G3 and G5 correspond to conventional drive operation and result in a common mode voltage component Vno as illustrated that includes six dv/dts per carrier cycle where a separate dv/dt occurs each time one of the modulating waveforms Vur, Vvr or Vwr intersects the carrier signal Tc (i.e., a separate dv/dt occurs at least of times t1, t2, t3, t4, t5 and t6 during the full carrier cycle illustrated in FIG. 7).

Figure 12:
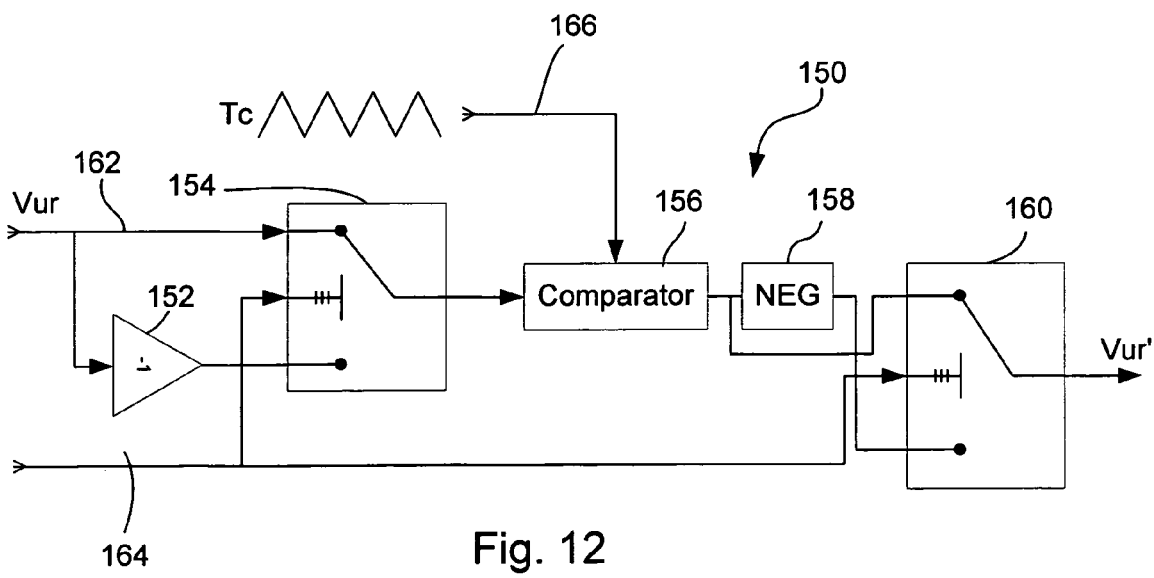
FIG. 12 is a schematic illustrating a circuit diagram that may be used to implement a portion of the method FIG. 11.

According to the inventive inverting scheme, after modulating waveforms Vur, Vvr and Vwr are generated, a processor identifies the instantaneous maximum (or, in the alternative, instantaneous minimum) value of the three waveforms and generates three separate invert control signals, one for each of the waveforms, where the invert control signal corresponding to the maximum (or, in the alternative, minimum) is high and the other two invert control signals are low. Here, hardware circuits like the circuit illustrated in FIG. 12 are provided for each of the three phases and each hardware circuit receives an associated modulating waveform and corresponding invert control signal. The hardware circuit that receives the high invert control signal causes the associated modulating waveform to be inverted and the inverted signal is then compared to the carrier signal Tc to generate an intermediate switch control signal. The other two non-inverted modulating waveforms are also compared to the carrier signal Tc to generate switch control signals for the other two phases. The intermediate switch signal is inverted to generate a modified switch signal and then the modified switch signal and the two unmodified switch signals are used to drive the inverter of FIG. 1.

Figure 11:
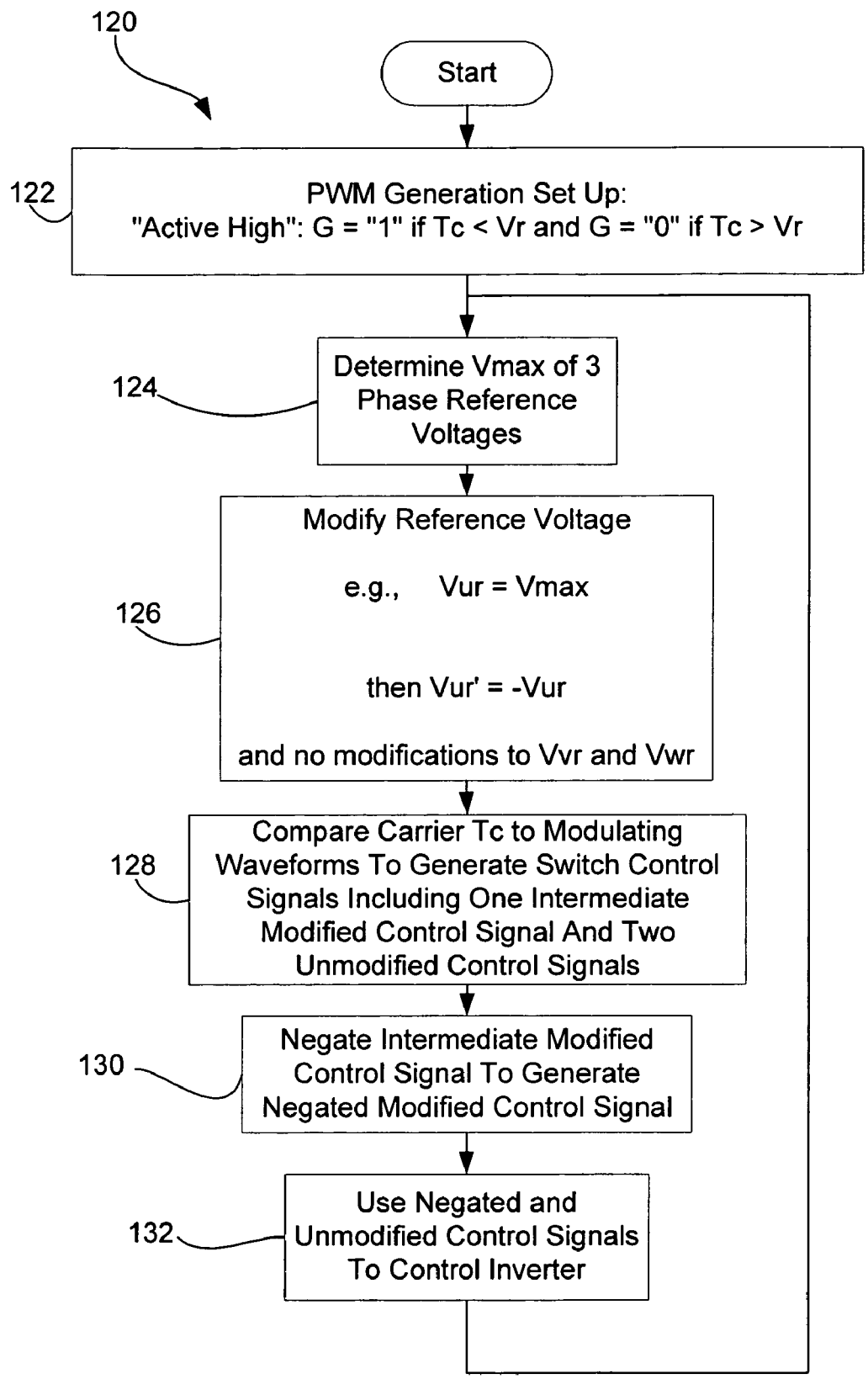
FIG. 11 illustrates another exemplary method for modifying modulating waveforms that is consistent with the waveforms and pulse sequences of FIGS. 10d-10g.

Referring to FIG. 11, a first exemplary method 120 consistent with one embodiment of the inverting scheme is illustrated. At block 122, the PWM generator rules are set to active high (or, in at least some embodiments, active low). At block 124, a drive processor identifies the maximum Vmax of the three phase voltages Vur, Vvr and Vwr. Referring also to FIG. 10a, in the illustrated example, the instantaneous maximum voltage is Vur. At block 126 the processor modifies one of the modulating waveforms by inverting the maximum phase modulating waveform. For instance, referring again to FIG. 10a, because Vur is the maximum, at block 126, Vur is set equal to −Vur. In FIG. 10d, a modified waveform −Vur is illustrated just below waveform Vwr.

Continuing, at block 128, the modulating waveforms including the modified waveform −Vur and the unmodified waveforms Vvr and Vwr are provided to the PWM generator and used to generate switch control signals.

Referring to FIGS. 10b and 10e, the resulting switch signals in the present example include signals G3 and G5 in FIG. 10b and intermediate switch signal G1i in FIG. 10e. Intermediate signal G1i is then inverted to generate negated modified signal G1' as shown in FIG. 10f. When signals G1', G3 and G5 and complimentary signals G2, G4 and G6 (not illustrated) are used to drive the inverter of FIG. 1, voltage Vno' illustrated in FIG. 10g results. As shown, voltage Vno' has only two dv/dts per carrier cycle and the peak value is less than in FIG. 10c and therefore CMC is substantially reduced.

During other periods of the waveforms Vur, Vvr and Vwr, others of the waveforms will be maximum and therefore the modified waveform and modified control signal will change during each carrier cycle.

In FIG. 12, a hardware circuit 150 for the u-phase is shown and includes two switches 154 and 160, an inverter 152, a comparator 156 and a negator 158. The input on line 162 is the u phase modulating waveform, the input on line 164 is the invert control signal for the u phase that indicates if the phase is maximum (or, in the alternative, minimum) and the input on line 166 is a carrier signal Tc. Waveform Vur is provided to inverter 152 and to one input of switch 154. The output of inverter 152 is provided to the second input of switch 154. The invert control signal is provided to the control input of switch 154 and selects Vur as an output when Vur is not the maximum value (or, in the alternative, is not the minimum value) and selects −Vur as the output when Vur is the maximum value (or, in the alternative, is the minimum value). The output of switch 154 is provided to comparator 156 along with carrier signal Tc and the output of comparator 156 is provided as one input to switch 160 and to negator 158. The output of negator 158 is provided as the second input to switch 160. The invert control signal is also provided to the control input of switch 160.

Figure 13:
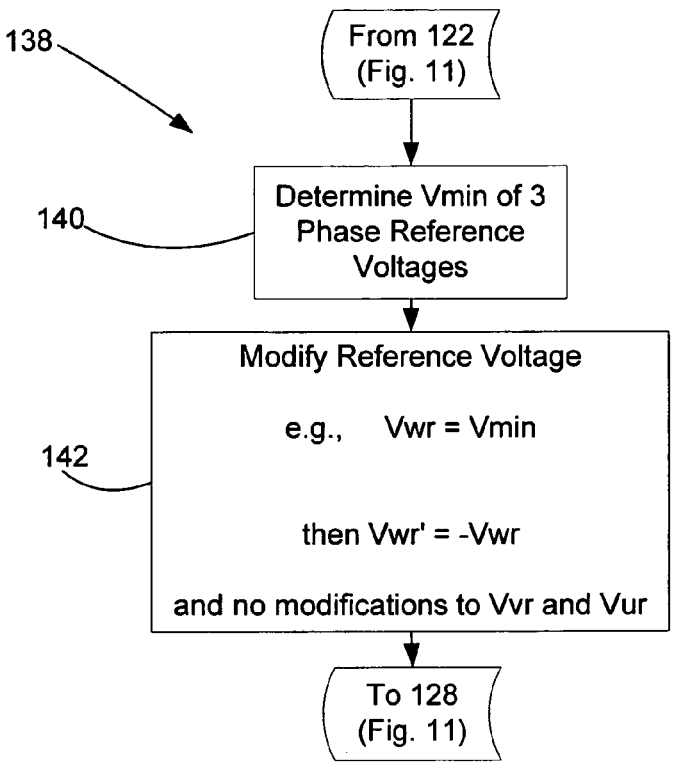
FIG. 13 is a sub process that may be substituted for a portion of the method of FIG. 11 and that is consistent with yet another inventive method.

Referring to FIG. 13, a subprocess 138 that may be used to replace steps 124 and 126 in FIG. 11 is illustrated where, instead of inverting the maximum modulating waveform, the minimum waveform is inverted and the resulting control signal is negated prior to inverter control. Referring also to the FIG. 14 series of figures, FIGS. 14a-14c are identical to FIGS. 10a through 10c described above and are only repeated here to simplify this explanation. Referring also to FIG. 11, after block 122 control may pass to block 140 in FIG. 13. Referring also to FIG. 14a, in the illustrated example, the instantaneous minimum voltage is Vwr. At block 142 the processor modifies one of the modulating waveforms by inverting the minimum phase waveform. For instance, referring again to FIG. 14a, because Vwr is the minimum, at block 142, Vwr' is set equal to −Vwr. In FIG. 14e, a modified waveform −Vwr is illustrated just above waveform Vur.

Continuing, control passes back to block 128 in FIG. 11, the modulating waveforms including the modified waveform −Vwr and the unmodified waveforms Vvr and Vur are provided to the PWM generator and used to generate switch control signals.

Referring to FIGS. 14b and 14e, the resulting switch signals in the present example include signals G1 and G3 in FIG. 14b and intermediate switch signal G51 in FIG. 14e. Intermediate signal G51 is then inverted to generate negated modified signal G5' as shown in FIG. 14f. When signals G1, G3 and G5' and complimentary signals G2, G4 and G6 (not illustrated) are used to drive the inverter of FIG. 1, voltage Vno' illustrated in FIG. 14g results. As shown, voltage Vno' has only two dv/dts per carrier cycle and the peak value is less than in FIG. 14c and therefore CMC is substantially reduced.

During other periods of the waveforms Vur, Vvr and Vwr, others of the waveforms will be minimum and therefore the modified waveform and modified control signal will change during each carrier cycle.

It should be appreciated that the results attained via any of the inverting schemes or methods are identical to the results that occur when any of the max-min methods are employed. In short, the inverting method shifts the switch control signals of one phase so that the pulses of one phase cancel the pulses of a second phase which in turn reduces the number of dv/dts in Vno' and which also reduces the peak values of Vno'.

C. Control Signal Modifying Scheme

Figure 15:
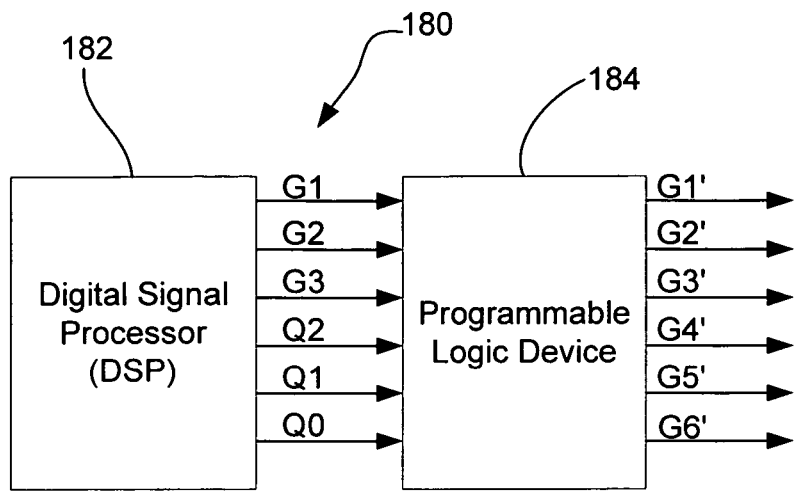
FIG. 15 is a schematic illustrating processing components that may be employed to implement yet another inventive embodiment.

According to the third scheme, instead of using an existing system processor or additional dedicated hardware to modify modulating waveforms prior to generating switch control signals, conventional switch control signals consistent with conventional carrier-based modulation scheme such as SVPWM or DPWM are generated and are then modified by an additional programmable logic device (PLD) as a function of which of the six sectors (see again FIG. 2) operation is currently in to achieve results that, in at least some embodiments, are identical to the results illustrated in and that are consistent with FIGS. 7e and 7f. To this end, referring to FIG. 15, in at least one embodiment a configuration 180 includes a digital signal processor (DSP) 182 and a programmable logic device (PLD) 184. DSP 182 generates conventional switch control signals for upper inverter switch devices G1, G3 and G5 (see again FIG. 1) along with a three bit word (Q2Q1Q0) that indicates in which of the six sectors S1 through S6 control instantaneously resides during system operation (i.e., control is in sectors S1 (i.e., Q2Q1Q0=001), S2 (i.e., Q2Q1Q0=010), S3 (i.e., Q2Q1Q0=011), S4 (i.e., Q2Q1Q0=100), S5 (i.e., Q2Q1Q0=101), and S6 (i.e., Q2Q1Q0=110), when Vu>Vv>Vw; Vv>Vu>Vw; Vv>Vw>Vu; Vw>Vu>Vv; Vw>Vv>Vu; Vu>Vw>Vv, respectively). The output signals of processor 182 are provided to PLD 184 which generates six modified control signals G1', G2', G3'G4', G5' and G6' where signals G2', G4' and G6' are the inverse of signals G1', G3' and G5', respectively.

In this third scheme, the general idea is to develop logic that can perform the same function as the methods described above so that the end result is identical to the results shown in FIG. 7b for G3 and G5, FIG. 7e for G1' and FIG. 7f for Vno' during sector S1 operation and similar results during operation in the other sectors S2 through S6.

Figure 16:
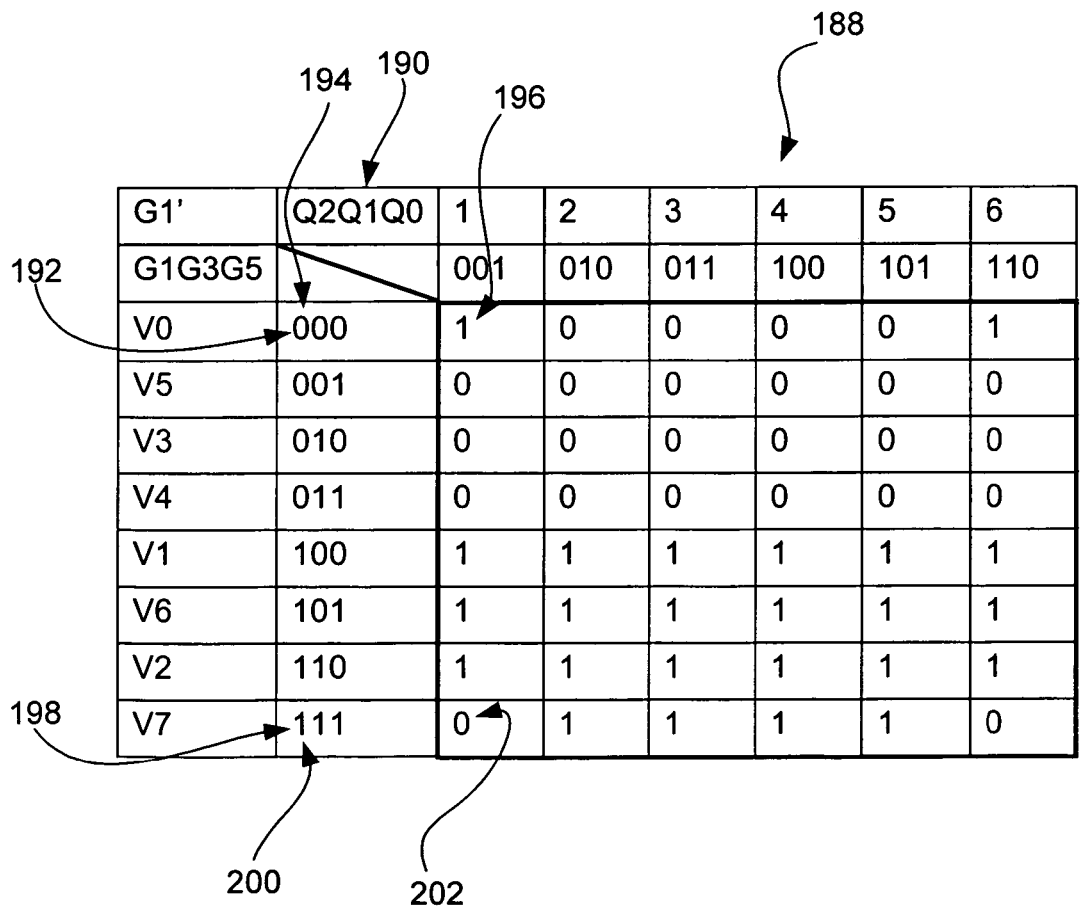
FIG. 16 is a Karnaugh diagram related to the method of FIG. 8 that is used to generate an equation for a modified switch control signal G1' given different operating sectors and different instantaneous vectors.

To identify proper logic to cause the intended results, Karnaugh diagrams have been formed as illustrated in FIGS. 16 through 18 for modified switch control signals G1' through G36', respectively, that correspond to the method illustrated in FIG. 8 (i.e., the max-min scheme where the maximum modulating waveform is replaced by the minimum modulating waveform). Referring to FIG. 16 that corresponds to control signal G1', the exemplary Karnaugh diagram 188 includes a G1G3G5 column 186 indicating values for each of switches G1, G3 and G5 generated by DSP 182 where the G1G3G5 combination corresponds to one of the eight possible vectors (e.g., V0 through V7 as illustrated in FIG. 2). Diagram 188 also includes sector columns S1 through S6 that correspond to similarly labeled sectors in FIG. 2 and that are each associated with a different Q2Q1Q0 combination. For instance, sector S1 corresponds to the Q2Q1Q0 combination "001", sector S3 corresponds to the Q2Q1Q0 combination "011", and so on.

Referring again to FIGS. 7b and 7e where operation occurs in sector S1 (i.e., Vur>Vvr>Vwr), signals G3 and G5 remain unchanged while signal G1 is altered to generate signal G1' by changing the signal G1 from off to on when the G1G3G5 combination is 000 (i.e., when vector V0 occurs) and by changing signal G1 from on to off when combination G1G3G5 is 111 (i.e., when vector V7 occurs). Thus, referring again to FIG. 16, in diagram 188, during sector S1 operation (i.e., Q2Q1Q0=001) (see column 190), when combination G1G3G5 is 000 (see 192), it can be seen that value G1' is changed from 0 (see 194) to 1 (see 196) (i.e., is changed from off to on) and when combination G1G3G5 is 111 (see 198), value G1' is changed from 1 (see 200) to 0 (see 202). During all other G1G3G5 combinations in sector S1, signal G1' remains unchanged.

Referring still to FIG. 16, changes made to signal G1 to generate signal G1' during sector S6 are identical to the changes that are made during sector S1 (i.e., when vectors V0 and V7 occur, G1 is changed from 0 to 1 and from 1 to 0, respectively, to generate signal G1'). During each of sectors S2, S3, S4 and S5, signal G1' is equal to the original signal G1 because the waveform Vur associated with signal G1 is not the maximum among waveforms Vur, Vvr and Vwr.

Referring to FIGS. 17 and 18, during sector S1 operation it can be seen that signals G3' and G5' are identical to signals G3 and G5 which is consistent with the information presented in the FIG. 7 series of figures. More specifically, in FIG. 17, signal G3' is 0, 0, 1, 1, 0, 0, 1, 1 during vectors V0 through V7, respectively, and in FIG. 18, signal G5' is 0, 1, 0, 1, 0, 1, 0, 1 during vectors V0 through V7, respectively.

Referring again to FIG. 17, during operation in each of sectors S2 and S3, the waveform Vvr associated with signal G3 is the maximum among waveforms Vur, Vvr and Vwr and therefore signal G3' is altered to eliminate occurrence of vectors V0 and V7 while each of signals G1' and G5' remain unchanged from the original G1 and G5 values (see signals G1' and G5' during sectors S2 and S3 in FIGS. 16 and 18, respectively). To eliminate vectors V0 and V7 during sectors S3 and S3, during operation in each of sectors S2 and S3, signal G3 is changed from 0 to 1 and from 1 to 0 when vectors V0 and V7 occur, respectively.

Referring again to FIG. 18, during operation in each of sectors S4 and S5, the waveform Vwr associated with signal G5 is the maximum among waveforms Vur, Vvr and Vwr and therefore signal G5' is altered to eliminate occurrence of vectors V0 and V7 while each of signals G1' and G3' remain unchanged from the original G1 and G3 values (see signals G1' and G3' during sectors S4 and S5 in FIGS. 16 and 17, respectively). To eliminate vectors V0 and V7 during sectors S4 and S5, during operation in each of sectors S4 and S5, signal G5 is changed from 0 to 1 and from 1 to 0 when vectors V0 and V7 occur, respectively.

After the Karnaugh diagrams in FIGS. 16-18 have been filled in as illustrated to correspond to the method illustrated in FIG. 8, the diagrams are used as well known in the PLD arts, to generate the following logic equations 5-7:

$$G_1' = G_1\overline{G_3} + G_1 G_3 \overline{G_5} + \overline{G_1 G_3 G_5}(\overline{Q_2 Q_1} Q_0 + Q_2 Q_1 \overline{Q_0}) + G_1 G_3 G_5 (\overline{Q_2} Q_1 + Q_2 \overline{Q_1}) \quad \text{Eq. 5}$$

$$G_3' = \overline{G_1} G_3 + G_1 G_3 \overline{G_5} + \overline{G_1 G_3 G_5}(\overline{Q_2} Q_1) + G_1 G_3 G_5 (\overline{Q_2} Q_0 + Q_2 \overline{Q_1} + Q_2 Q_1 \overline{Q_0}) \quad \text{Eq. 6}$$

$$G_5' = \overline{G_1 G_3} G_5 + \overline{G_1} G_3 G_5 + G_1 \overline{G_3} G_5 + \overline{G_1 G_3 G_5}(\overline{Q_2 Q_1}) + G_1 G_3 G_5 (\overline{Q_2} Q_0 + Q_1 \overline{Q_0}) \quad \text{Eq. 7}$$

PLD 184 is programmed to solve Equations 5 through 7 based on inputs G1, G2 and G3 as well as values Q0, Q1 and Q2. Signals G2', G4' and G6' are the inverse of related signals G1', G3' and G5'. Signals G1', G2', G3', G4', G5' and G6' are used to drive the switches of the inverter or converter controlled thereby.

Referring to FIGS. 19-21, Karnaugh diagrams associated with the second version of the max-min method described above where minimum modulating waveforms are modified to eliminate vectors V0 and V7 are illustrated. Equations that result from the FIG. 19-21 diagrams include the following equations:

$$G_1' = G_1\overline{G_3} + G_1 G_3 \overline{G_5} + \overline{G_1 G_3 G_5}(\overline{Q_2 Q_1} Q_0 + Q_2 \overline{Q_1 Q_0}) + G_1 G_3 G_5 (\overline{Q_1} Q_0 + Q_1 \overline{Q_0}) \quad \text{Eq. 8}$$

$$G_3' = \overline{G_1} G_3 + G_1 G_3 \overline{G_5} + \overline{G_1 G_3 G_5}(Q_2 \overline{Q_1} Q_0 + Q_2 Q_1 \overline{Q_0}) + G_1 G_3 G_5 (\overline{Q_2 Q_1} Q_0 + \overline{Q_2} Q_1 + Q_2 \overline{Q_1 Q_0}) \quad \text{Eq. 9}$$

$$G_5' = \overline{G_1 G_3} G_5 + \overline{G_1} G_3 G_5 + G_1 \overline{G_3} G_5 + \overline{G_1 G_3 G_5}(\overline{Q_2 Q_1} Q_0 + \overline{Q_2} Q_1 \overline{Q_0}) + G_1 G_3 G_5 (\overline{Q_2} Q_1 Q_0 + Q_2 \overline{Q_1} + Q_2 Q_1 \overline{Q_0}) \quad \text{Eq. 10}$$

To implement a method consistent with FIG. 9, PLD 184 is programmed to solve Equations 8 through 10 based on inputs G1, G2 and G3 as well as values Q0, Q1 and Q2. Signals G2', G4' and G6' are the inverse of related signals G1', G3' and G5'. Signals G1', G2', G3', G4', G5' and G6' are used to drive the switches of the inverter or converter controlled thereby.

Figure 23:
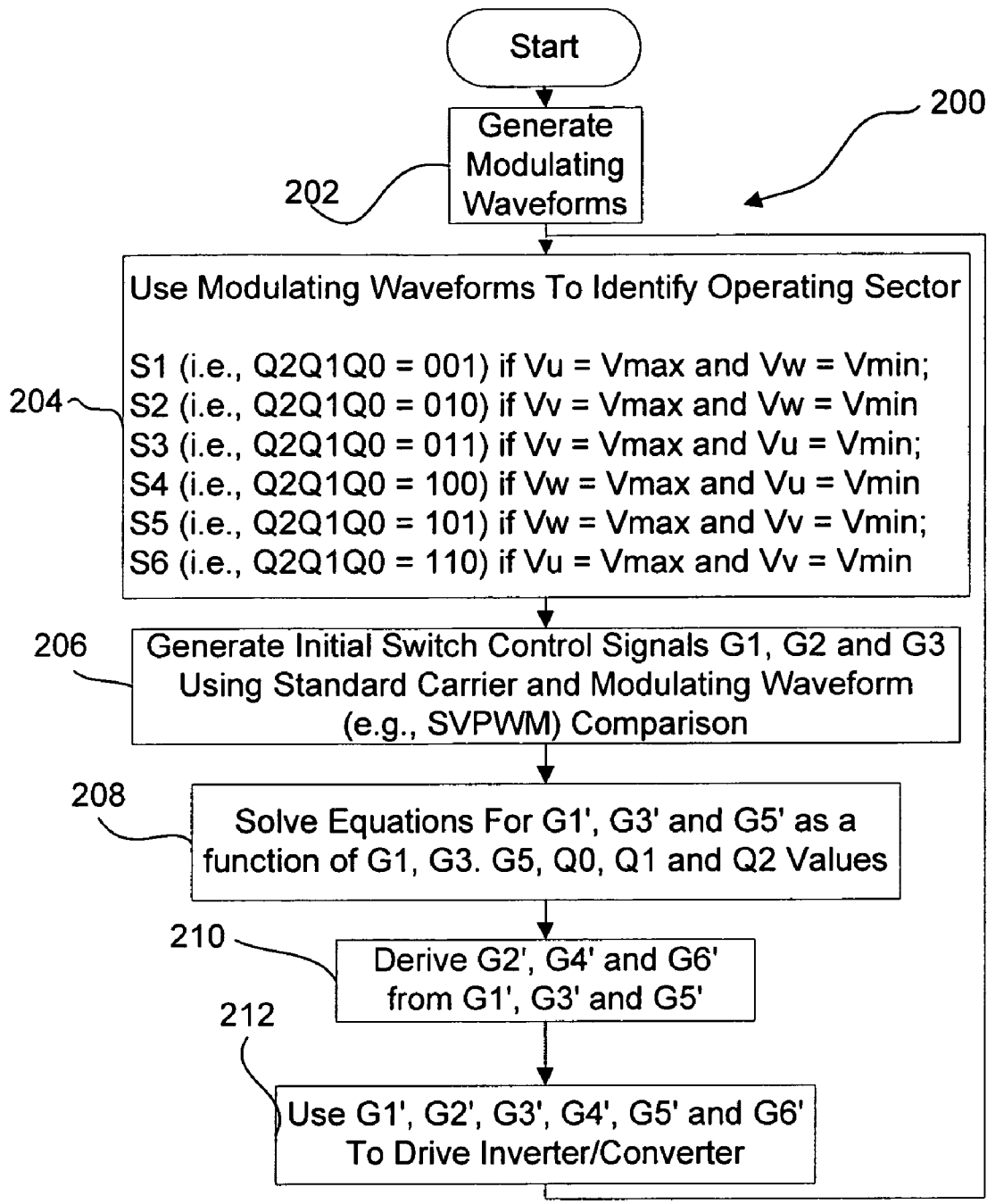
FIG. 23 is a flow diagram illustrating another inventive method.

Referring to FIG. 23, an exemplary method 200 for implementing the signal modifying scheme is shown. At block 202, modulating waveforms Vu, Vv and Vw are generated. At block 204 the modulating waveforms are used to identify the instantaneous sector (e.g., S1, S2, etc.) of operation according to the illustrated rules so that Q2, A1 and Q0 values can be determined. At block 206 DSP 182 (see FIG. 15) generates signals G1, G2 and G3 and provides values Q2, Q1 and Q0 to PLD. At block 208 PLD 184 solves either equations 5-7 or equations 8-10 to generate modified switching signals G1', G3' and G5'. At block 210 signals G2, G4' and G6' are derived from signals G1', G3' and G5', respectively and at block 212 signals G1' through G6' are used to drive the inverter or converter to be controlled thereby.

Figure 3:
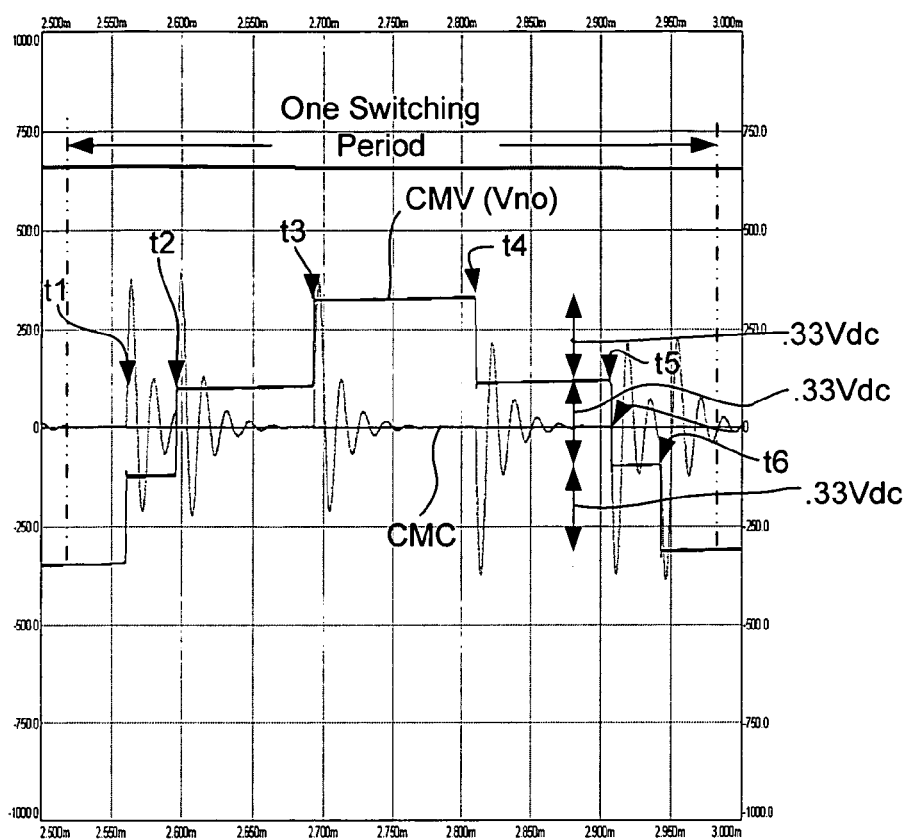
FIG. 3 is a graph illustrating a common mode voltage and a common mode current that result when conventional space vector PWM control is employed.
Figure 4:
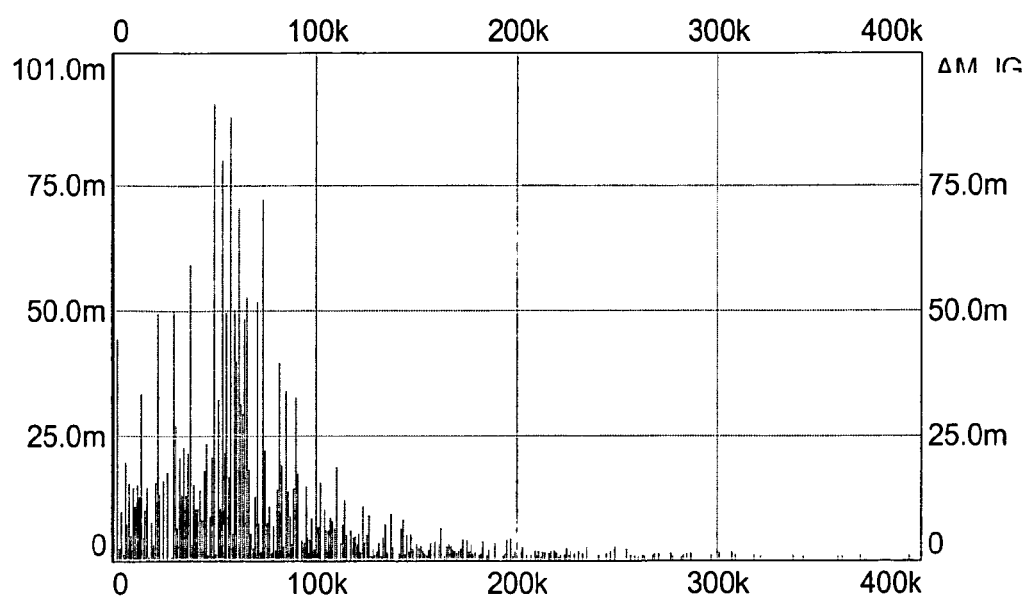
FIG. 4 is a FFT plot corresponding to the current in FIG. 3.
Figure 5:
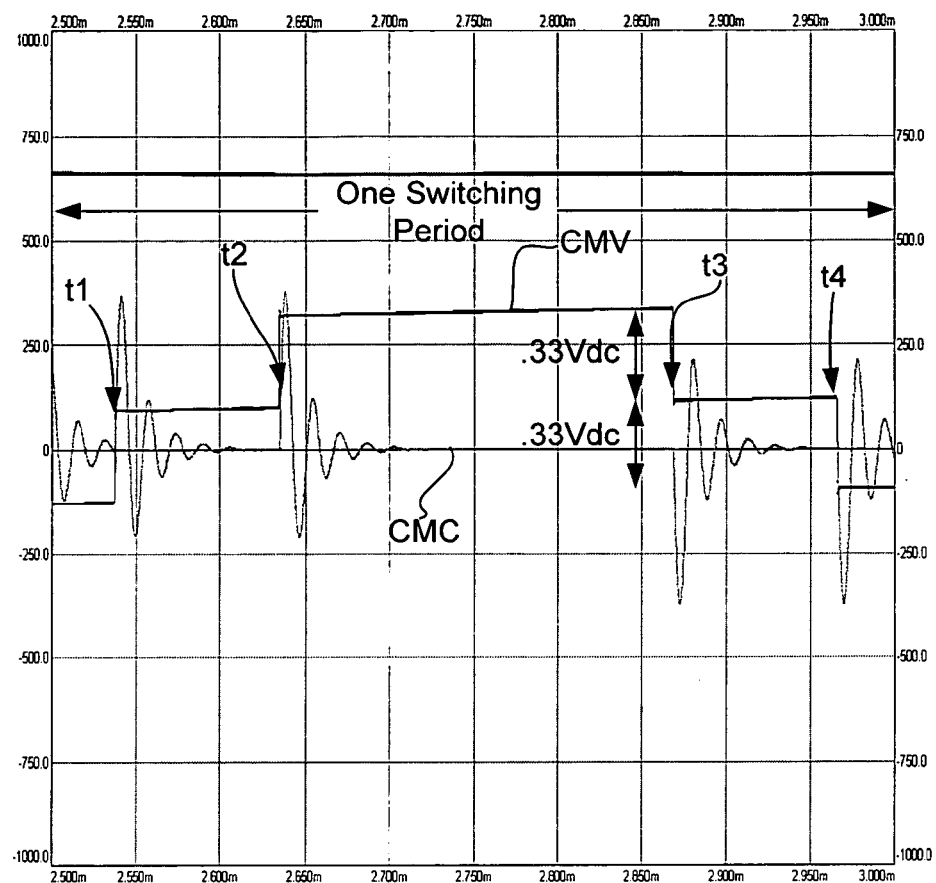
FIG. 5 is similar to FIG. 3, albeit corresponding to DPWM control.
Figure 6:
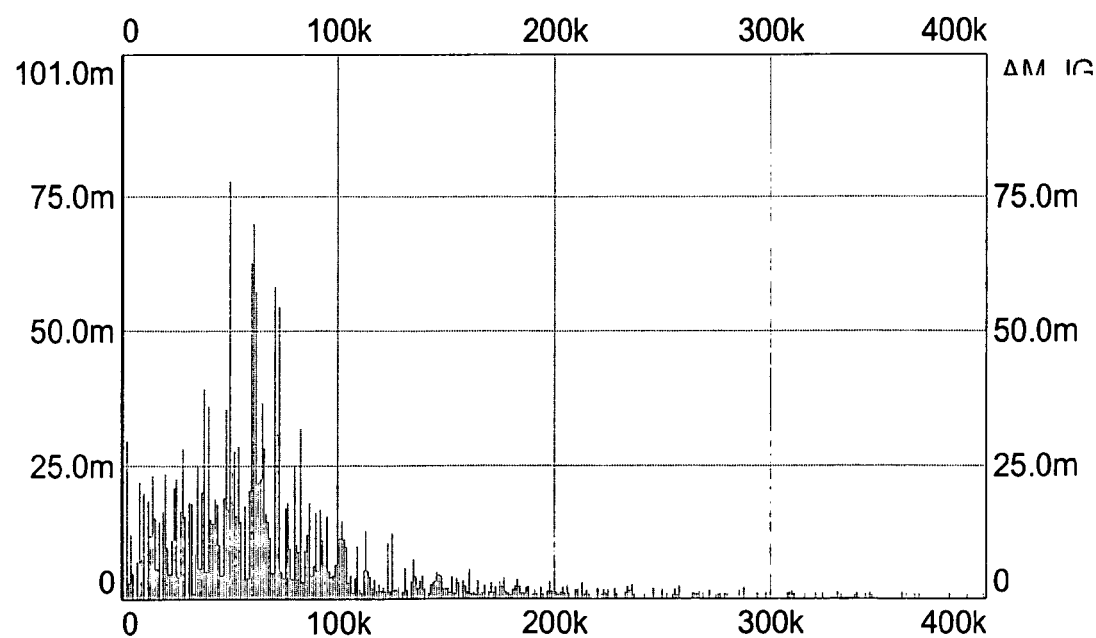
FIG. 6 is a FFT plot corresponding to the current in FIG. 5.
Figure 22A:
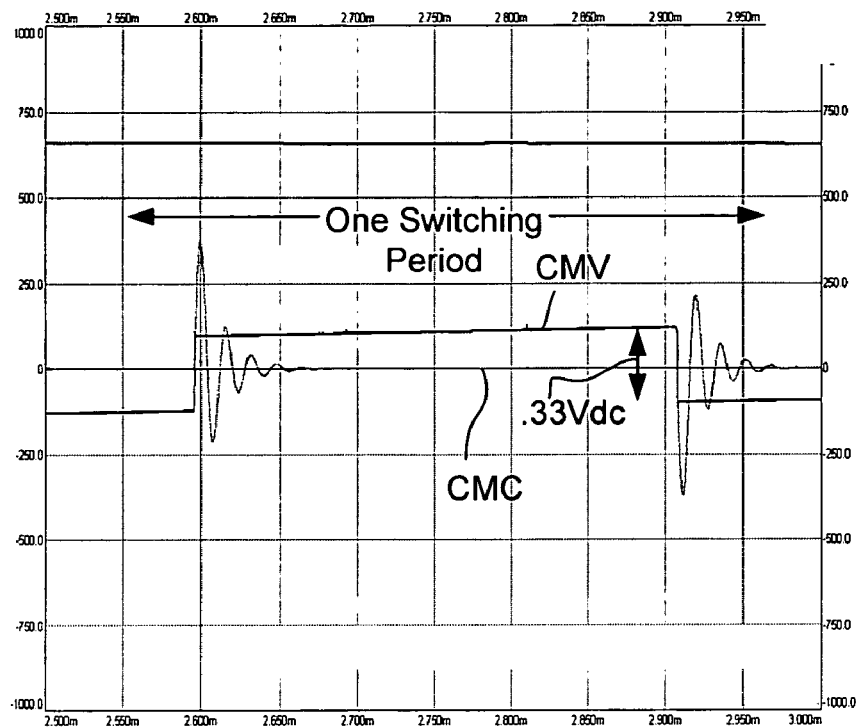
FIG. 22a is a graph illustrating common mode voltage and common mode current akin to the graph shown in FIG. 3, albeit where one of the inventive methods has been employed to reduce common mode voltage and common mode current.
Figure 22B:
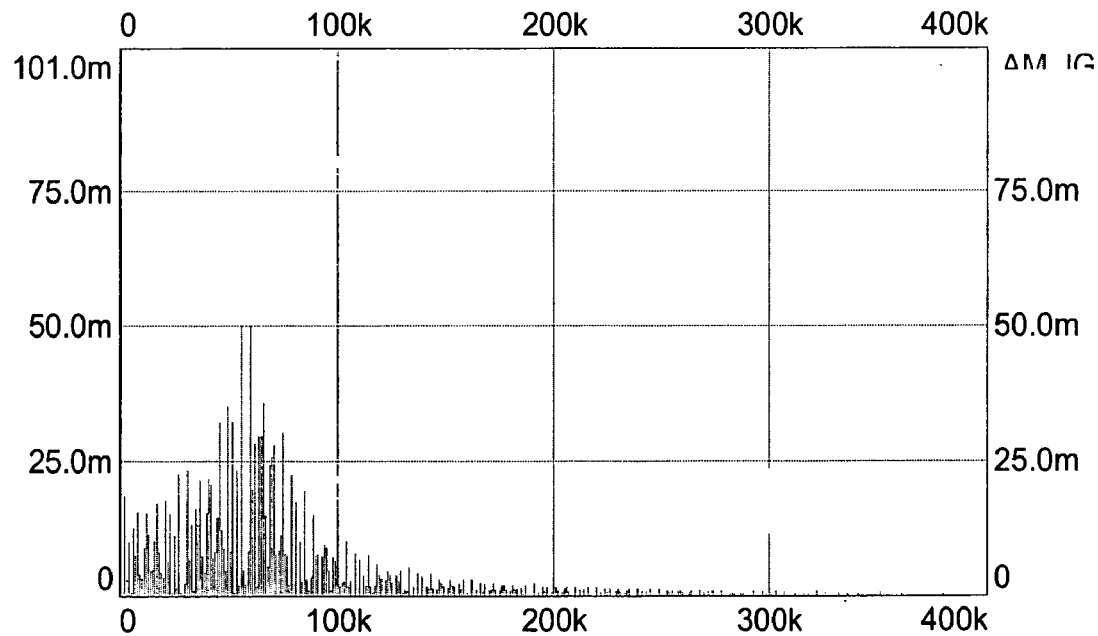

Referring to FIGS. 22a and 22b, plots similar to those shown in FIGS. 3 and 4 are shown where one of the inventive methods described above was employed to modify SVPWM control to reduce CMV and CMC. Comparing FIGS. 22a and 22b to 3 and 4 it can be seen that using one of the inventive methods, the magnitude of the peak to peak swing in the CMV is one third the magnitude when standard SVPWM is employed. In addition, it can be seen that the number of dv/dts during a switching cycle are reduced appreciably (i.e., from six to two) which in turn reduces CMC spiking. In fact, experiments have shown that the RMS CMC is reduced from 1.0 pu to 0.577 pu using the inventive schemes to modify SVPWM control.

Although not illustrated, the results where the present invention is used to reduce CMV and CMC in the context of DPWM control are also positive. To this end, applying any of the inventive methods above to DPWM, the number of dv/dts during a switching cycle are reduced from four to two, the peak to peak CMV is reduced by half and experiments have shown that the RMS CMC is reduced from 0.816 pu to 0.577 pu using the inventive schemes to modify DPWM control.

Figure 24:
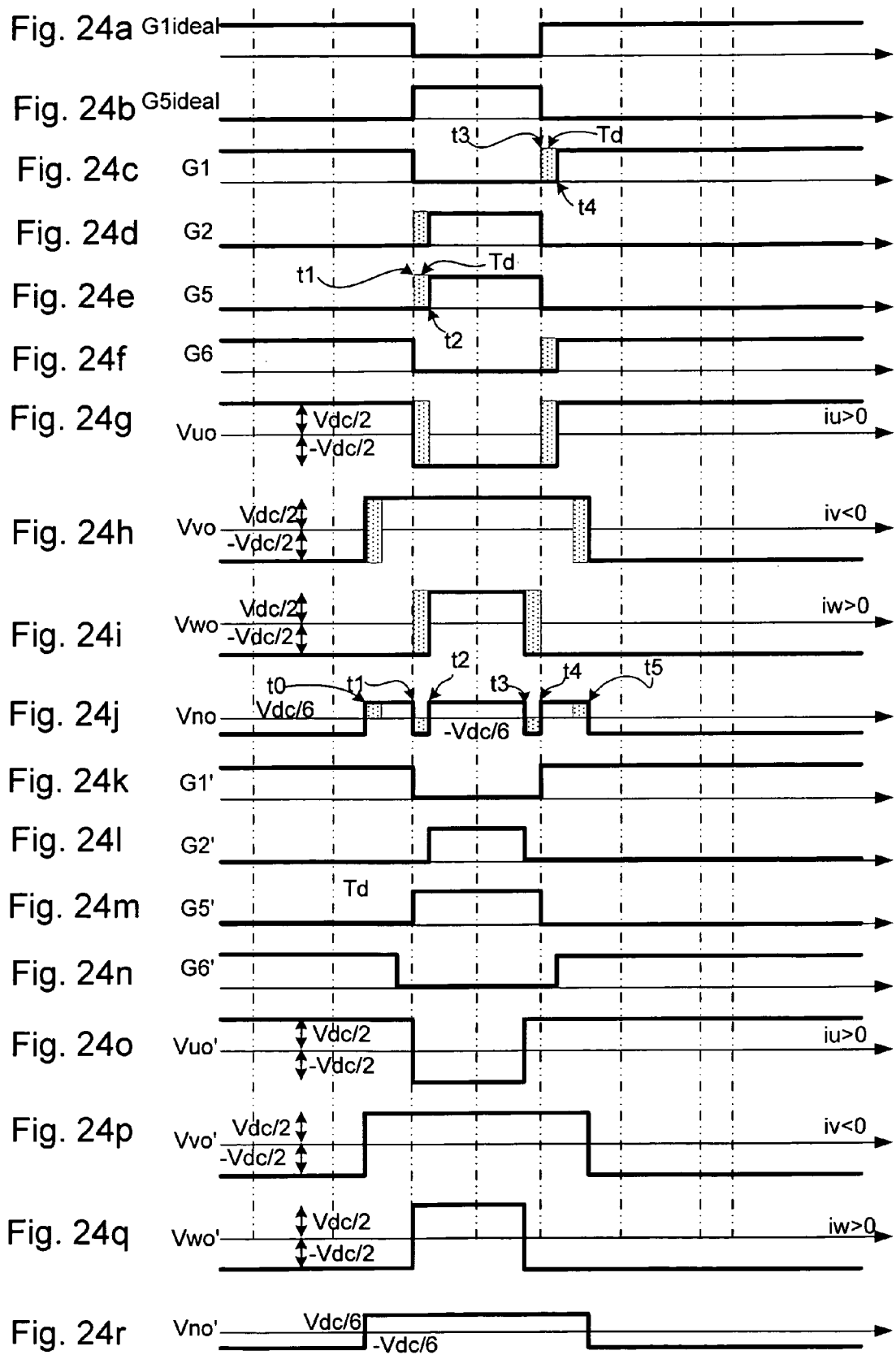
FIGS. 24a through 24r illustrate various switch control signals including ideal control signals for upper switches in two phases, corresponding control signals for upper switches in two phases and associated lower switches where turn on delays have been added, resulting phase voltages, a resulting common mode voltage, switch control signals for two phases where compensation for the turn on delays has been implemented, resulting phase voltages and a resulting common mode voltage for operation of a system during a subperiod of sector 1 operation when u and w phase currents are both positive.

Referring now to the FIG. 24 series of figures, a number of graphs illustrate voltage Vno dips that occur during a sub-period of sector S1 (see again FIG. 2) operation when dead time compensation as well known in the PWM control arts is applied to switch control signals after the Max-Min scheme as described above has been applied. The sub-period of sector S1 represented by the FIG. 24 series of figures corresponds to the sub-period when phase currents iu and iw are positive. In FIGS. 24a and 24b, ideal G1 ideal and G5 ideal switch control signals are illustrated that result from setting an initial maximum reference waveform Vur equal to the minimum reference waveform signal Vwr and altering PWM control (e.g., resetting the generator from active high to active low for the modified reference phase waveform) in a manner consistent with the method described above with respect to the FIG. 7 series of figures. Dead time compensation is also applied to the third phase (i.e., affecting signals G3 and G4) but the affect there does not cause Vno dips during operation in this specific sub-period of sector S1 operation because signal G3 is not aligned with either of signals G1 or G5 and therefore the compensation does not combine with one of the other phases to cause a Vno dip.

FIGS. 24c and 24e illustrate G1 and G5 signals after dead time compensation has been implemented to delay the G1 and G5 turn on times from times t4 to t5 and from times t1 to t2, respectively, resulting in delays Td as illustrated. Similarly, FIGS. 24d and 24f show how the turn on times of signals G2 and G6 associated with signals G1 and G5 have been delayed. Referring to FIGS. 24g, 24h and 24i, resulting phase voltages Vuo, Vvo and Vwo are shown and in FIG. 24j, a resulting Vno waveform is illustrated which includes multiple dv/dts at times t0, t1, t2, t3, t4 and t6 and reduced Vno dips that occur between times t1 and t2 and times t3 and t4. Thus, when dead time compensation is implemented after the Max-Min scheme has been implemented, six dv/dts occur during each carrier signal half cycle.

Figure 25:
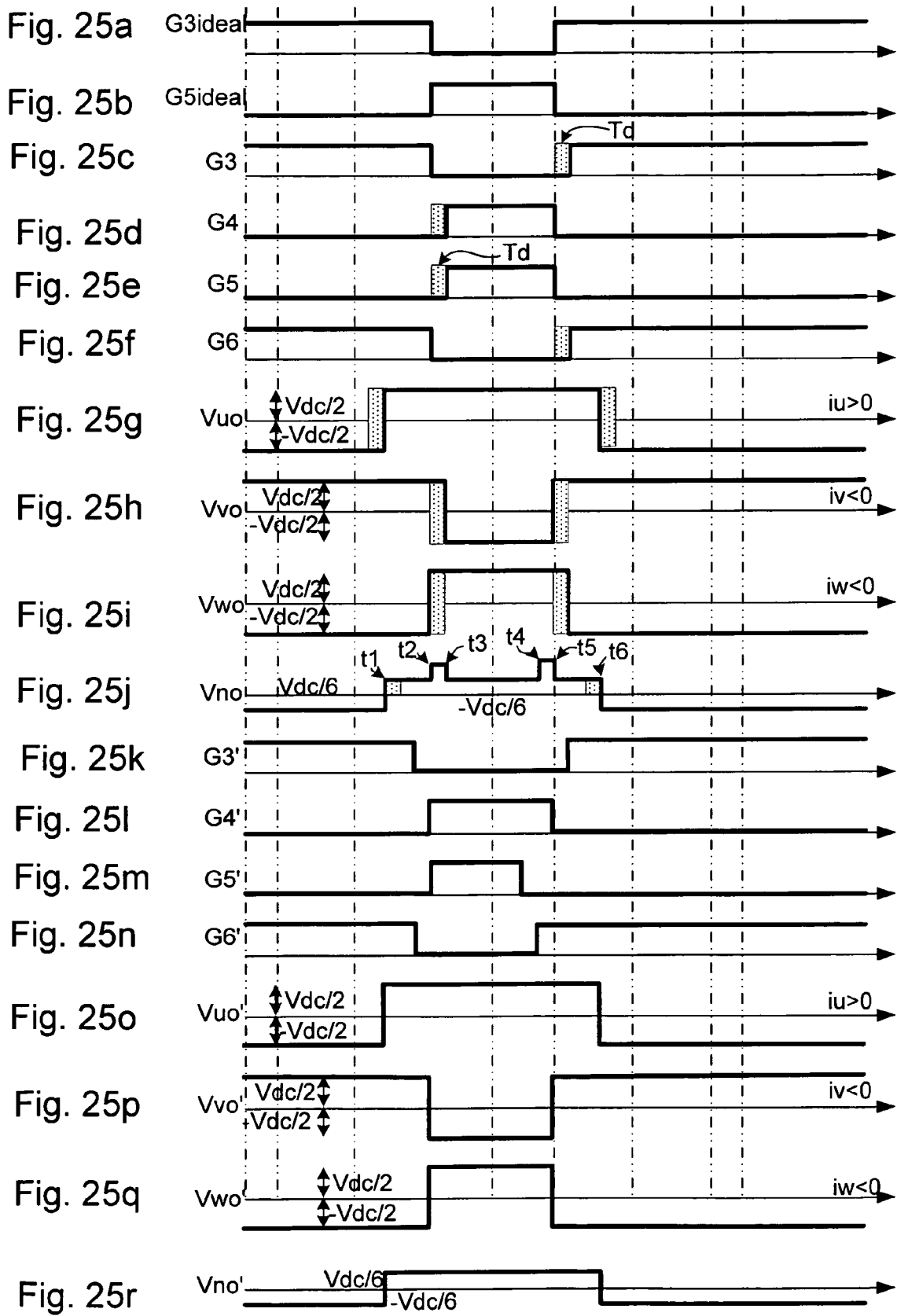
FIGS. 25a through 25r are similar to FIGS. 24a through 24r, albeit corresponding to sector 2 operation when only the u phase current is positive.

Referring to the FIG. 25 series of figures, the FIG. 25 series includes figures akin to the FIG. 24 series of figures during the sub-period of sector S2 operation when only current iu is positive. In the FIG. 25 series, ideal signals G3 ideal and G5 ideal and related signals are illustrated that correspond to the maximum and minimum reference voltages Vvr and Vwr, respectively. During this sub-period of operation, as illustrated, dead time compensation results in turn on delays Td illustrated in FIGS. 25c-25f and voltages Vuo, Vvo and Vwo (see FIGS. 25g-25i) which in turn cause voltage Vno (see FIG. 25j) that has dv/dts that occur at times t0, t1, t2, t3, t4 and t6 where spikes occur between times t1 and t2 and times t3 and t4. While operation during sub-periods of only sectors S1 and S2 is described above, it has been recognized that similar dips and spikes occur during sub-periods of operation in each of sectors S1 through S6.

According to at least some inventive embodiments the number of dv/dts that occur during sector S1 and sector S2 operation can be reduced by modifying either the modulating or reference waveforms prior to comparison to the carrier signal by the PWM inverter or by modifying the switch control signals generated by the PWM generator. To this end, referring to FIGS. 24k and 24m, during operation in sector S1 when currents iu and iw are both positive, the turn on times of each of signals G1' and G5' are simply advanced from times t5 and t2 to times t4 and t1, respectively, and signals G2' and G6' are modified accordingly as illustrated in FIGS. 24l and 24n. Resulting voltages Vuo', Vvo' and Vwo' are shown in FIGS. 24o, 24p and 24q and the modified voltage Vno' is shown in FIG. 24r. As illustrated, modified voltage Vno' does not include the four dv/dts at times t1, t2, t3 and t4 that occurred in FIG. 24j. Similarly, as shown in FIGS. 25k through 25r, turn on times of signal G1 can be advanced and turn off times of signal G5 can be advanced by a turn on period Td to eliminate the voltage spikes as best seen in FIG. 25r.

Referring again to the FIGS. 24 and 25 series of figures, therefore, it can be seen that when a phase current is positive, turn on times have to be advanced by approximately the turn on delay period Td and when a phase current is negative, the turn off times have to be advanced by approximately the turn on delay period Td to substantially reduce the number of dv/dts (i.e., the spikes and dips) in the Vno voltage.

Figure 26:
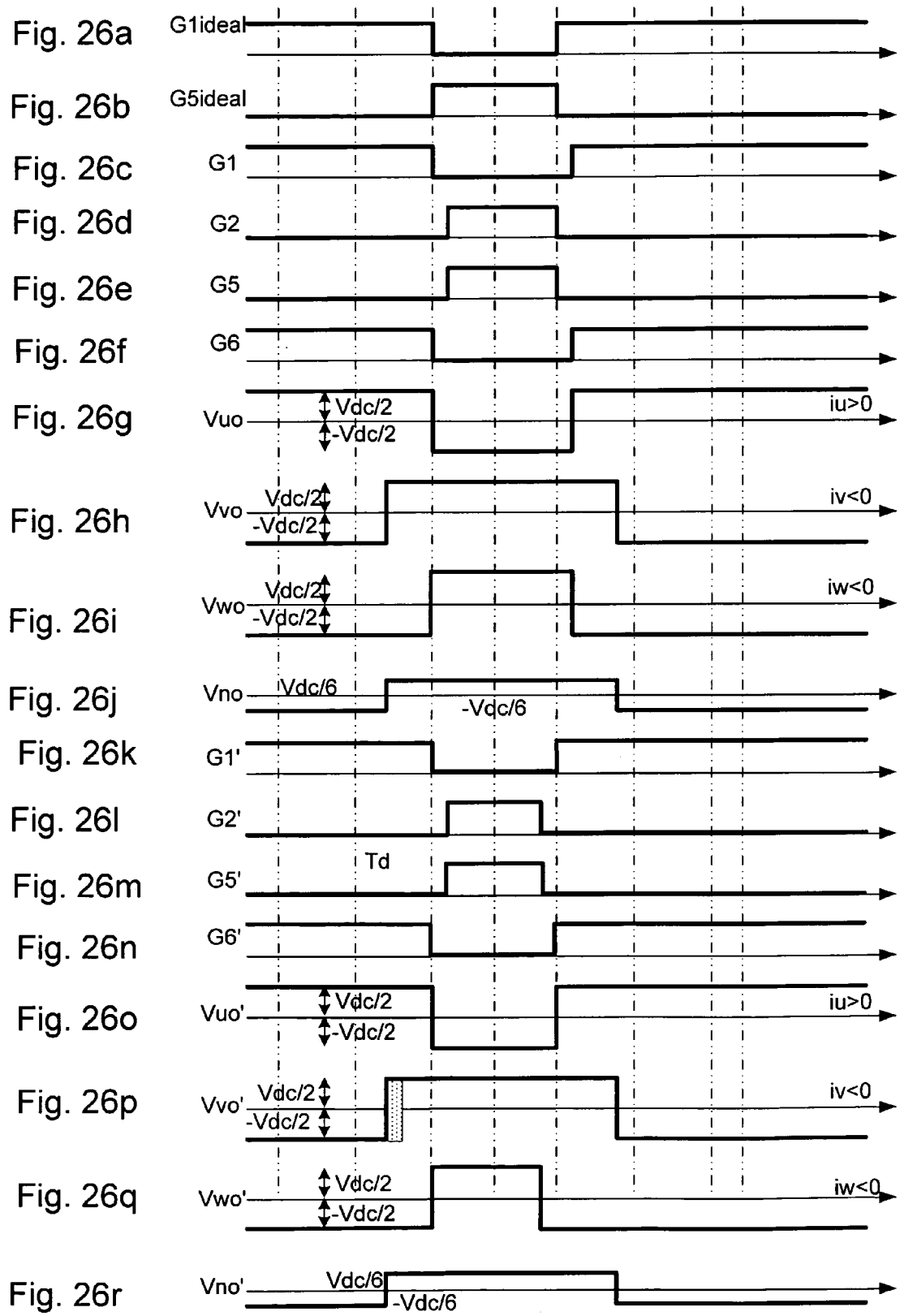
FIGS. 26a through 26r are similar to FIGS. 24a through 24r, albeit corresponding to sector 1 operation when only the u phase current is positive.

Referring now to the FIG. 26 series of figures, figures akin to the figures illustrated in the FIG. 24 series of figures are shown, albeit corresponding to operation during the sub-period of sector 1 operation that occurs when only current iu is positive (i.e., currents iv and iw are each negative). As shown, voltage Vno results in the pulse form in FIG. 26j after dead time compensation has occurred where voltage Vno does not include either spikes or dips. Where turn on times and turn off times are advanced for phases that have positive and negative currents in a manner consistent with the description above with respect to the FIG. 24 and FIG. 25 series of figures, respectively, the resulting voltage Vno' is unchanged.

Figure 27:
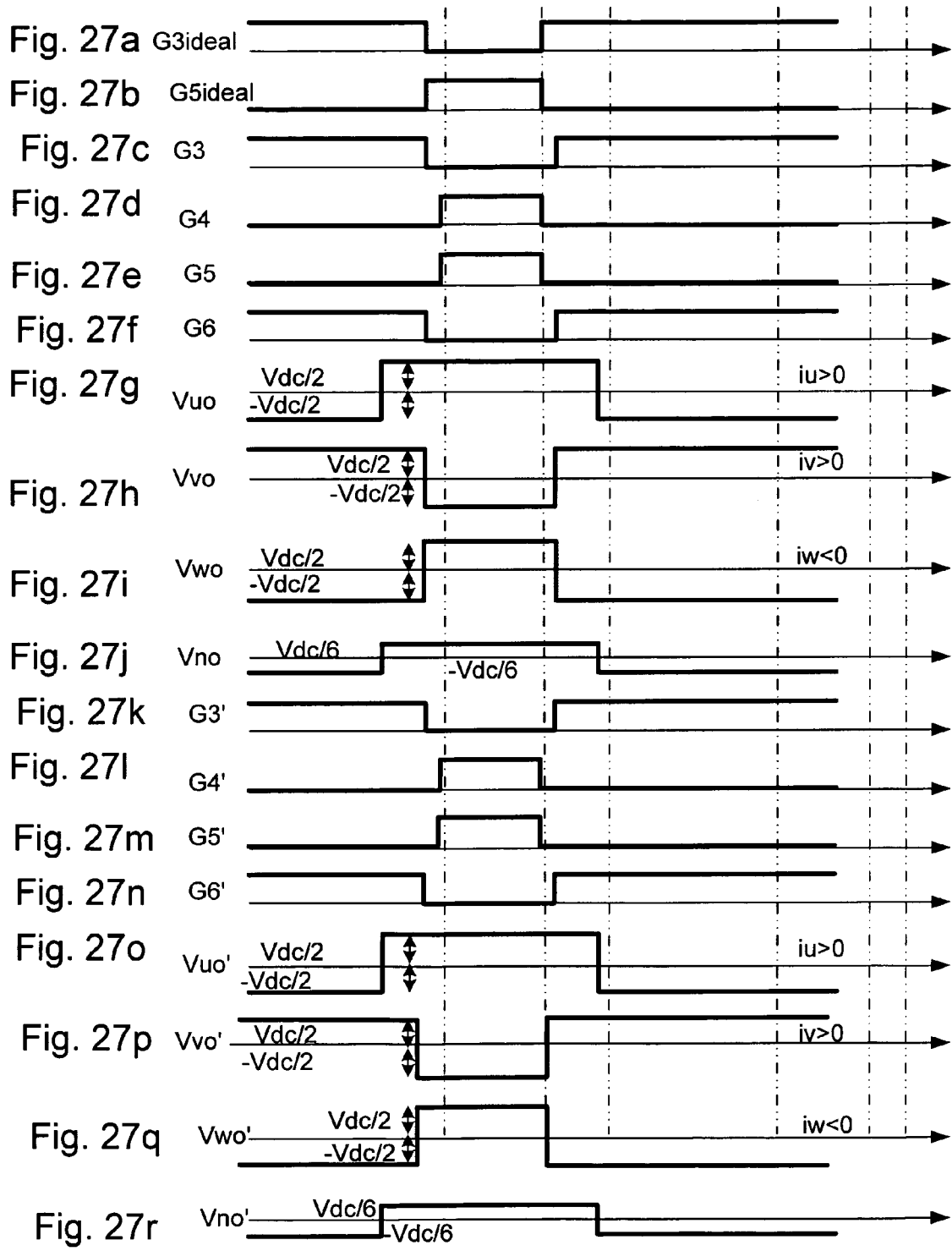
FIGS. 27a through 27r are similar to FIGS. 24a through 24r, albeit corresponding to sector 2 operation when both the u and v phase currents are positive.

Referring now to the FIG. 27 series of figures, figures akin to the figures illustrated in the FIG. 24 series of figures are shown, albeit corresponding to operation during the sub-period of sector 2 operation that occurs when only current iw is negative (i.e., currents iu and iv are each positive). As shown, voltage Vno results in FIG. 27j after dead time compensation has occurred where voltage Vno does not include either spikes or dips. Where turn on times and turn off times are advanced for phases that have positive and negative currents in a manner consistent with the description above with respect to the FIG. 24 and FIG. 25 series of figures, respectively, the resulting voltage Vno' is unchanged.

Thus, as a general rule, to minimize dv/dts where the Max-Min scheme is employed, when a phase current is positive, turn on times are advanced by a delay period Td and when a phase current is negative, turn off times are advanced by a delay period Td and under other conditions the times are not advanced.

One way to advance turn on or turn off times is to alter a modulating waveform. Thus, for instance, on one hand, where a PWM generator is operated in the active high mode of operation (i.e., a switch control signal goes high (i.e., to 1) when the reference signal is greater than the carrier signal) and a phase current is positive, the turn on time of a switch control signal generated by comparing the reference signal to a carrier signal can be advanced by increasing the reference signal by a compensation voltage value Vcom where Vcom is a value that is selected to compensate for the effects of dead time compensation plus, in at least some embodiments, to compensate for device dynamics and/or other parasitic losses. Similarly, where a PWM generator is operated in the active high mode of operation and a phase current is negative, the turn off time of a switch control signal generated by comparing the reference signal to a carrier signal can be advanced by decreasing the reference signal by a compensation voltage value Vcom.

On the other hand, where a PWM generator is operated in the active low mode of operation (i.e., a switch control signal goes low (i.e., to 0) when the reference signal is greater than the carrier signal) and a phase current is positive, the turn on time of a switch control signal generated by comparing the reference signal to a carrier signal can be advanced by decreasing the reference signal by a compensation voltage value Vcom where Vcom is a value that is selected to compensate for the effects of dead time compensation plus, in at least some embodiments, to compensate for device dynamics and/or other parasitic losses. Similarly, where a PWM generator is operated in the active low mode of operation and a phase current is negative, the turn off time of a switch control signal generated by comparing the reference signal to a carrier signal can be advanced by increasing the reference signal by a compensation voltage value Vcom.

Table 3 below summarizes how modulating or reference waveforms are to be modified to eliminate the dead time related spikes and dips described above where modifications in box 1, box 2, box 7 and box 8 correspond to compensation that occurs during active low operation and modifications in box 3, bos 4, box 5 and box 6 correspond to compensation that occurs during active high operation.

TABLE 3

| Carrier status | Counting up | | Counting down | |
|---|---|---|---|---|
| Motor current polarity | iL > 0 | iL < 0 | iL > 0 | iL < 0 |
| Trigger pulse: Turn on | (Box 1) −Vcom | (Box 2) 0 | (Box 3) +Vcom | (Box 4) 0 |
| Trigger pulse: Turn off | (Box 5) 0 | (Box 6) −Vcom | (Box 7) 0 | (Box 8) +Vcom |

Thus, during active low operation, when a phase current is positive and the carrier is counting up (box 1), Vcom is subtracted from the reference waveform, when a phase current is negative and the carrier is counting down (box 8), Vcom is added to the reference waveform and under other circumstances during active low operation (i.e., during box 2 and box 7 operation) no compensation occurs. Similarly, during active high operation, when a phase current is negative and the carrier is counting up (box 6), Vcom is subtracted from the reference waveform, when a phase current is positive and the carrier is counting down (box 3), Vcom is added to the reference waveform and under other circumstances during active high operation (i.e., during box 4 and box 5 operation) no compensation occurs.

Figure 28:
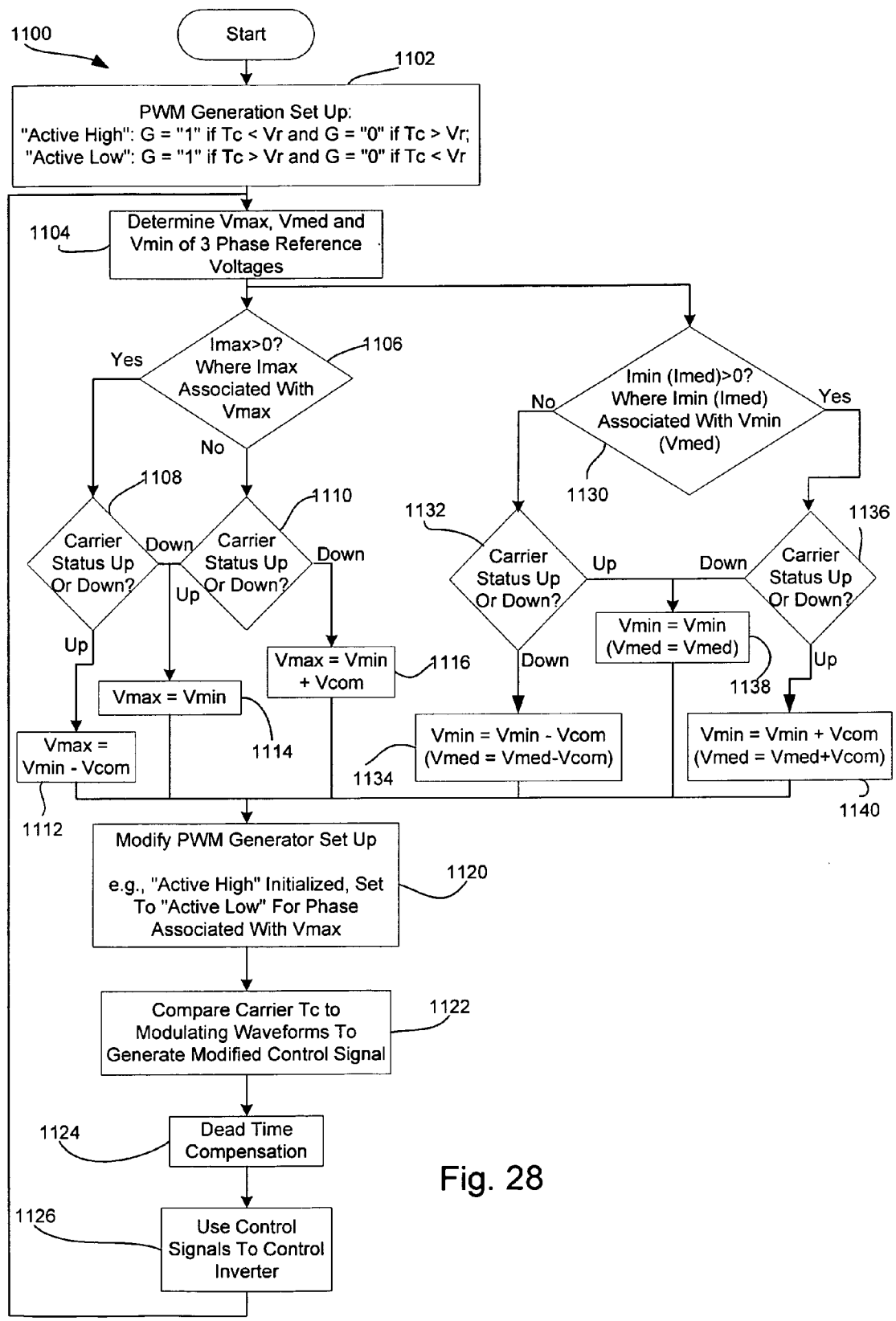
FIG. 28 is a flowchart illustrating a method consistent with the method described above with respect to FIG. 8, albeit where dead time compensation is implemented.

Referring now to FIG. 28, an exemplary method 1100 for modifying modulating waveforms in a manner consistent with the method described above with respect to FIG. 8 where dead time compensation is also facilitated is illustrated. At block 1102, the PWM generator is set up to be either active high or active low. Here, it will be assumed that the PWM generator is initially set up to operate according to an active high protocol. At block 1104, a processor determines the maximum, medium and minimum reference voltages among the three phases of the system. After block 1104, control passes to each of blocks 1106 and 1130.

At block 1106, a processor determines whether or not the maximum current Imax is greater than zero where the maximum current is associated with the maximum phase voltage Vmax. Where the maximum current is greater than zero, control passes to block 1108 where the processor determines whether or not the carrier signal is counting up or counting down. Where the carrier signal is counting up, control passes to block 1112 where the maximum reference voltage Vmax is set equal to the minimum voltage reference Vmin minus the compensation voltage Vcom after which control passes to block 1120. Referring again to decision block 1108, where the carrier status is counting down, control passes to block 1114 where the maximum reference voltage Vmax is set equal to the minimum reference voltage Vmin after which control passes to block 1120.

Referring once again to decision block 1106, where the maximum current Imax that is associated with the maximum voltage Vmax is less than zero (i.e., is negative), control passes to block 1110. At block 1110, the processor determines whether or not the carrier status is counting up or down. Where the carrier is counting up, control passes to block 1114 where maximum reference voltage Vmax is set equal to the minimum reference voltage Vmin after which control passes to block 1120. Referring again to decision block 1110, where the carrier is counting down, control passes to block 1116 where the maximum reference voltage Vmax is set equal to minimum reference voltage Vmin plus the compensation voltage value Vcom after which control passes to block 1120.

Referring still to FIG. 28, at block 1130, the processor determines whether or not the minimum phase current Imin is greater than zero where the minimum phase current is associated with the minimum phase reference voltage Vmin. Similarly, at block 1130, the processor determines whether or not the medium phase current Imed is greater than zero where the medium phase current is associated with the medium phase reference voltage Vmed. Where one or both of the minimum or medium phase currents is less than zero or negative, control passes to block 1132 where the processor determines whether or not the carrier is counting up or down. Where the carrier is counting down, control passes to block 1134 where the reference voltage associated with the negative minimum and/or medium phase current is modified by subtracting the compensation voltage value Vcom after which control passes to block 1120. At block 1132, where the carrier is counting up, control passes to block 1138 where the phase reference voltage associated with the negative maximum or medium phase current is unchanged after which control passes to block 1120.

Referring once again to block 1130, where one of the minimum or medium phase currents Imin or Imed, respectively, is greater than zero or positive control passes to block 1136 where the processor determines whether or not the carrier is counting up or down. Where the carrier is counting up at block 1136, control passes to block 1140 where the compensation voltage Vcom is added to the phase reference voltage associated with the positive phase current at block 1130 after which control passes to block 1120.

Referring once again to FIG. 28, here, it should be appreciated that the reference voltage modifications that take place at blocks 1106, 1008, 1110, 1112, 1114 and 1116 correspond to modifications to the maximum reference voltage Vmax and are consistent with the modifications in Table 3 corresponding to box 1, box 2, box 7 and box 8. Thus, the modification that occurs at block 1112 corresponds to mod1 where the current is positive and the carrier status is counting up, the modification that occurs at block 1116 corresponds to box 8 where the current is negative and the carrier status is counting down and block 1114 corresponds to box 2 and box 7 where the current is negative and the carrier is counting up and the current is positive and the carrier is counting down, respectively. Similarly, modifications to the reference voltages that occur at blocks 1130, 1132, 1134, 1136, 1138 and 1140 modify the minimum and medium reference voltages Vmin and Vmed and correspond to modifications to Table 3 including box 3, box 4, box 5 and box 6. To this end, the modifications that occur at block 1140 correspond to box 3, the modifications (or lack thereof) at block 1138 correspond to box 4 and box 5 and the modifications at block 1134 correspond to box 6 in Table 3.

At block 1120, the processor modifies the PWM generator set up so that, instead of being set active high, the generator is set up for active low for the phase associated with the maximum reference voltage Vmax. Continuing, at block 1122, the PWM generator compares the carrier signal to the modulating waveforms to generate the modified control signals. At block 1124, dead time compensation delays are used to modify the control signals and at block 1126 control signals compensated for dead time are used to control the inverter. After block 1126, control passes back up to block 1104 where the process continues.

Figure 29:
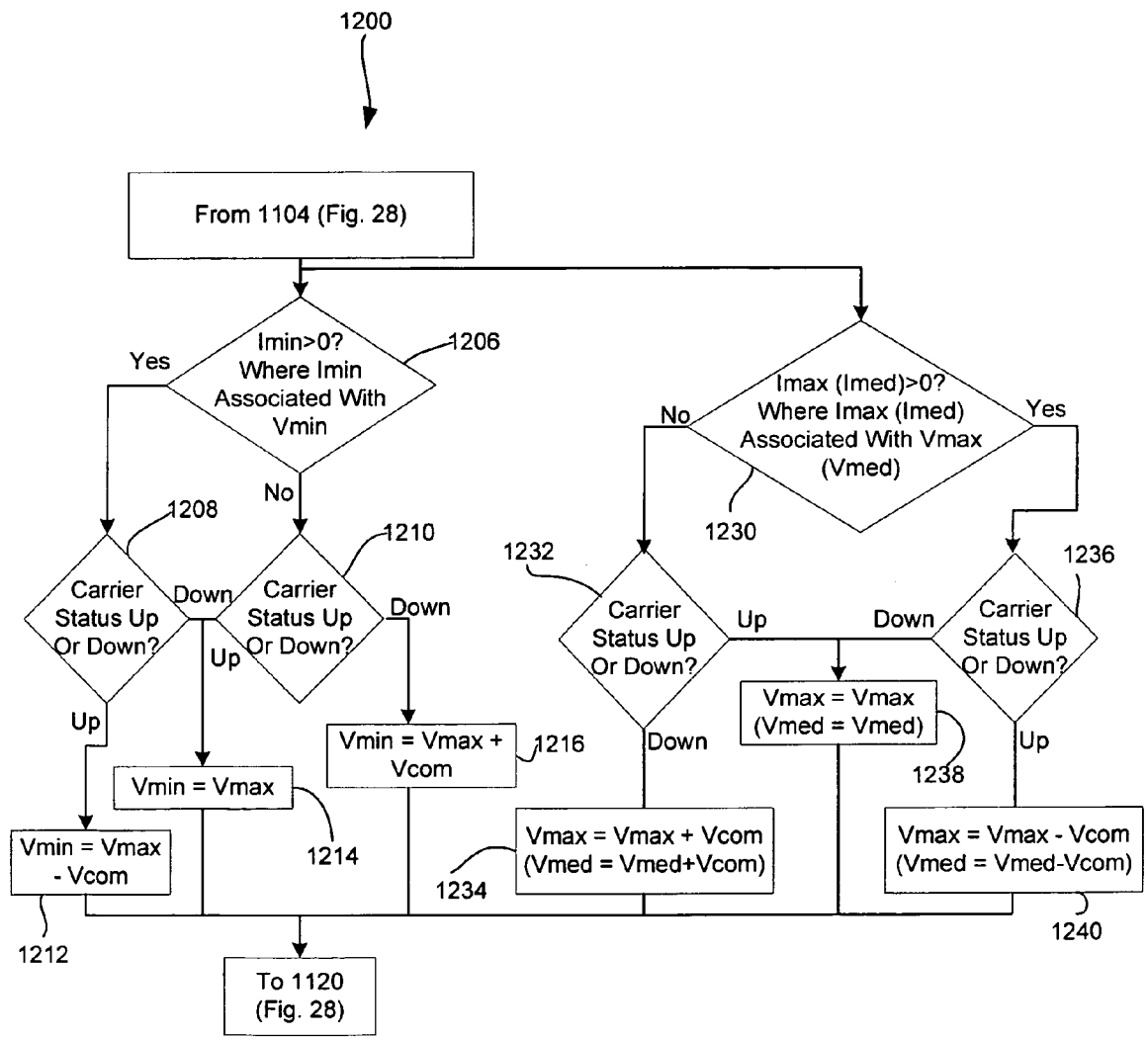
FIG. 29 is a subprocess that may be substituted for a portion of the method of FIG. 28 that is consistent with the method described above with respect to FIG. 9, albeit where dead time compensation is implemented.

Referring now to FIG. 29, a subprocess 1200 that may be substituted for a portion of the process illustrated in FIG. 28 is shown, albeit where modulating waveform modifications are consistent with the subprocess shown in FIG. 9 instead of the process shown in FIG. 8. To this end, referring also to FIG. 28, after block 1104, control may pass to both of blocks 1206 and 1230 in FIG. 29. In FIG. 29, the subprocess shown is akin to the subprocess in FIG. 28 that occurs between blocks 1104 and 1120 where the minimum phase current Imin and the minimum phase reference voltage Vmin are swapped for the maximum phase current Imax and the maximum phase reference voltage Vmax in all of the blocks. Thus, for instance, where block 1106 in FIG. 28 is affected by the status of the maximum phase current Imax, in FIG. 29, similar block 1206 operates as a function of the minimum phase current Imin. To indicate similarity between the blocks in FIGS. 28 and 29, blocks in FIG. 29 that are similar to blocks in FIG. 28 have been labeled with numbers that are incremented by the numbers in FIG. 28 by 100. For instance, block 1206 in FIG. 29 is akin to block 1106 in FIG. 28, block 1208 in FIG. 29 is akin to block 1108 in FIG. 28, block 1234 in FIG. 29 is akin to block 1134 in FIG. 28, and so on. Thus, the primary differences between the process associated with FIGS. 28 and 29 is that, in FIG. 28 maximum reference voltages are replaced by minimum reference voltages and in FIG. 29 minimum reference voltages are replaced by maximum reference voltages.

Figure 30:
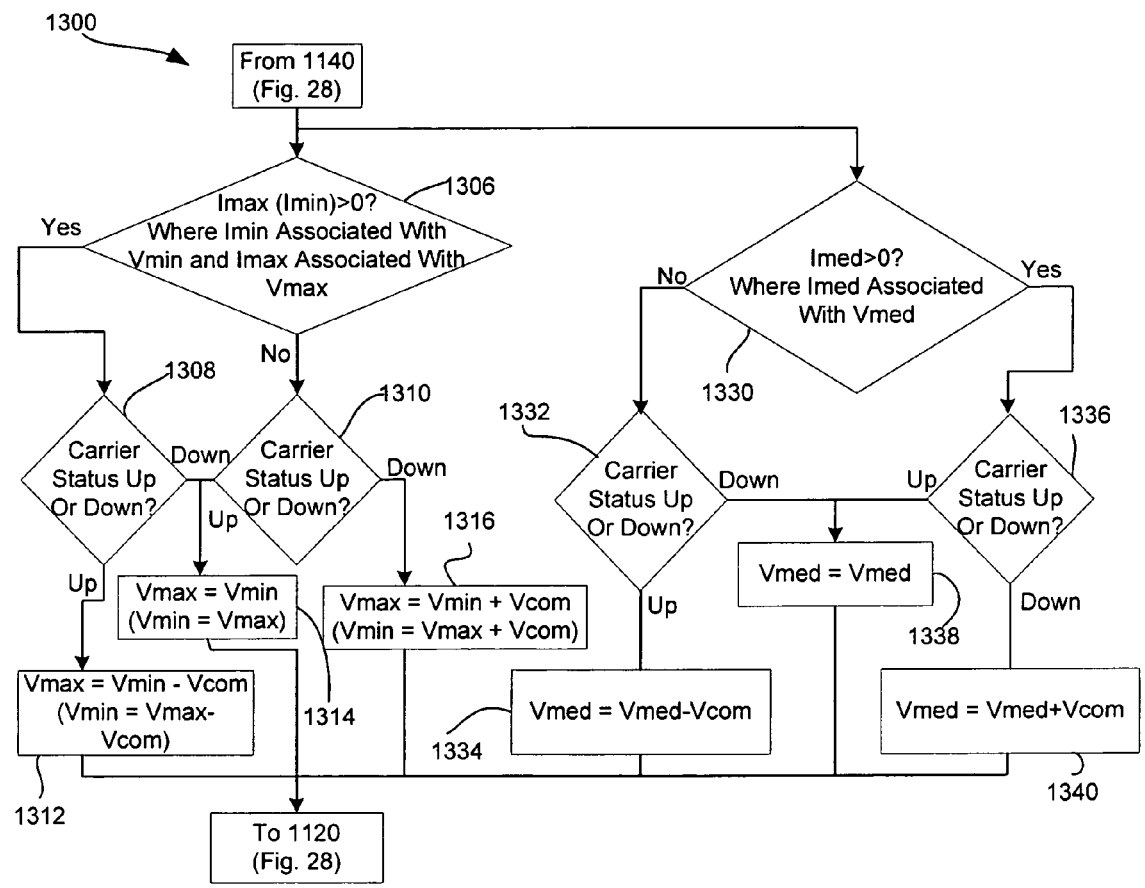
FIG. 30 is a subprocess that may be substituted for a portion of the method of FIG. 28, albeit implementing yet another inventive method that results in reduced common mode voltage spikes, albeit where the number of dv/dts is not reduced.

Referring now to FIG. 30, one additional sub process 1300 that may be substituted for a portion of the process in FIG. 28 is illustrated for modifying modulating waveforms in a manner that reduces the magnitude of spikes in voltage Vno that occur as a result of conventional dead time compensation. In the subprocess of FIG. 30, instead of altering just one of the maximum and minimum phase reference voltages as in FIGS. 28 and 29, both the maximum and minimum phase reference voltages are modified. To this end, referring also to FIG. 28, after block 1104, control may pass to each of blocks 1306 and 1330 in FIG. 30. At block 1306, a processor determines whether or not the maximum phase current Imax is positive or negative where the maximum phase current is associated with the maximum phase reference voltage Vmax. In addition, at block 1306, the processor determines whether or not the minimum phase current Imin is positive or negative where the minimum phase current is associated with the minimum phase reference voltage Vmin. Where any one of the minimum or maximum phase currents is positive, control passes to block 1308 where the processor determines whether or not the carrier is counting up or down. Where the carrier is counting up, control passes to block 1312 where the phase reference voltages associated with positive current at block 1306 are modified. Specifically, where the maximum phase current Imax was positive at block 1306, the maximum phase reference voltage Vmax is set equal to the minimum phase reference voltage Vmin minus the compensation voltage Vcom. Similarly, where the minimum phase current Imin was positive at block 1306, the minimum phase reference voltage Vmin is set equal to the maximum phase reference voltage Vmax minus the compensation voltage Vcom. After block 1312, control passes to block 1120 in FIG. 28. At block 1308, where the carrier is counting down, control passes to block 314 where each phase reference voltage of the maximum and minimum phase reference voltages that corresponds to a positive current at block 1306 is set equal to the other of the maximum and minimum phase reference voltages after which control passes to block 1120.

Referring once again to block 1306, where one of the maximum or minimum phase currents is negative, for that phase, control passes to block 1310. At block 1310 the processor determines whether or not the carrier is counting up or down. Where the carrier is counting up, control passes to block 1314 where, for each of the maximum and minimum phase reference currents associated with a negative phase current at block 1306, the phase reference voltage is set equal to the other of the maximum and minimum phase reference voltages after which control passes to block 1120 in FIG. 28. Where the carrier is counting down at block 1310, control passes to block 1316 where, for each of the maximum and minimum phase reference voltages associated with a negative current at block 1306, the processor sets the phase reference voltage equal to the other of the maximum and minimum phase reference voltages plus the compensation voltage Vcom. After block 1316, control passes to block 1120 in FIG. 28.

Referring yet again to FIG. 30, at block 1330, the processor determines whether or not the medium phase current Imed which is associated with the medium phase reference voltage Vmed is positive or negative. Where the medium phase current Imed is negative, control passes to block 1332 where the processor checks carrier status. Where the carrier is counting up at block 1332, control passes to block 1334 where the medium reference voltage Vmed is decremented by compensation voltage Vcom after which control passes to block 1120. At block 1332, where the carrier is counting down, control passes to block 1338 where the medium reference voltage Vmed is not changed after which control passes to block 1120. At block 1330, where the medium phase current Imed is positive, control passes to block 1336 where carrier count is checked. Where the carrier is counting up at block 1336, control passes to block 1338 where the medium phase reference voltage Vmed is unchanged after which control passes to block 1120. Where the carrier is counting down at block 1336, control passes to block 1340 where the medium reference voltage Vmed is incremented by compensation voltage Vcom after which control passes to block 1120 in FIG. 28.

While not illustrated, here, it should be appreciated that, while 6 dv/dts will occur during each carrier cycle with the subprocess illustrated in FIG. 30, the peak value of the voltage Vno' resulting from the subprocess will be reduced as no spikes like those illustrated in FIG. 25j should result.

Figure 31:
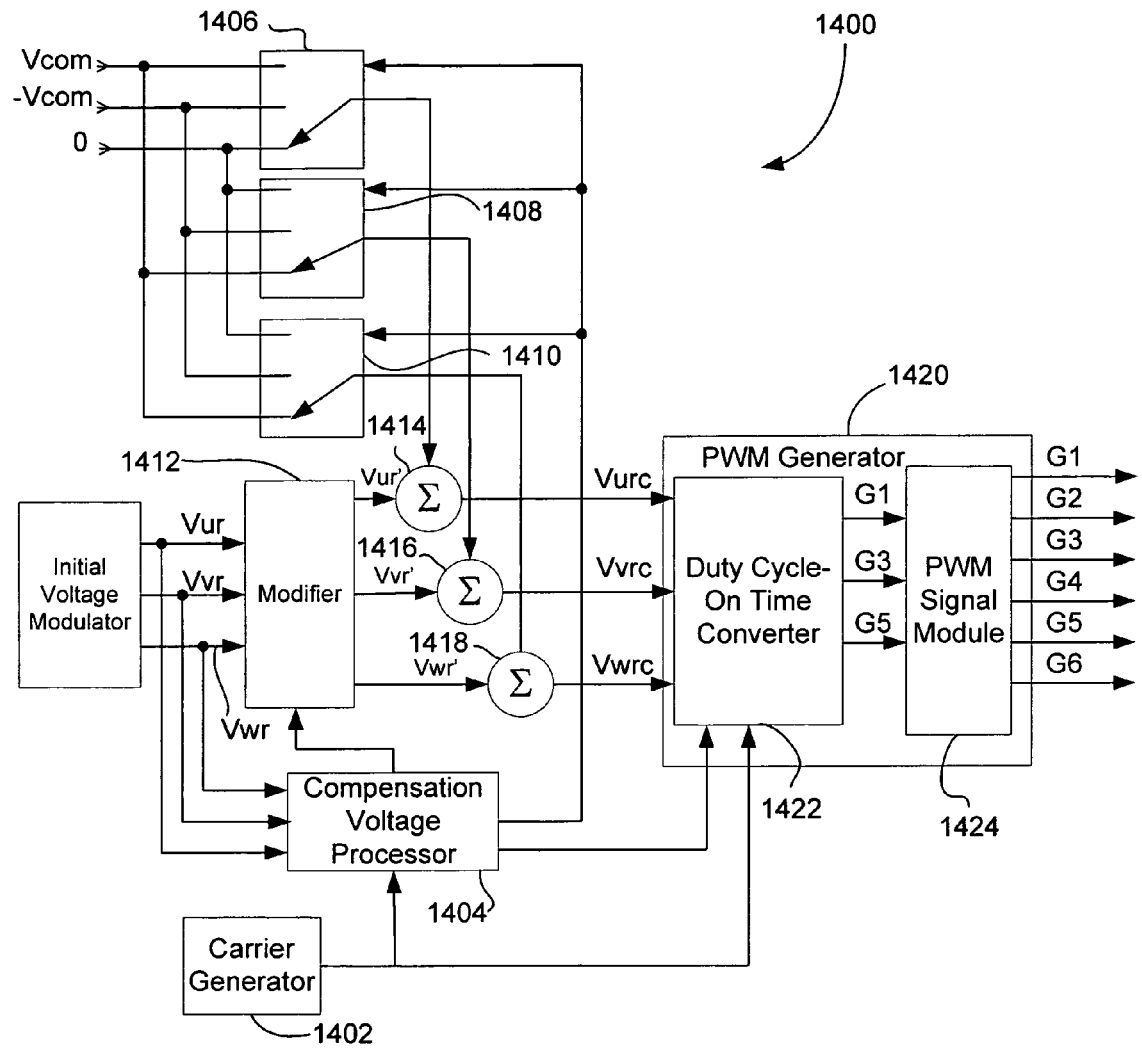
FIG. 31 is a schematic illustrating a system for implementing at least some of the inventive methods described with respect to the other figures.

Referring now to FIG. 31, a schematic illustrating an exemplary system 1400 for implementing any of the methods described above wherein dead time compensation occurs is illustrated. System 1400 includes a carrier generator 1402, a compensation voltage processor 1404, three switching devices 1406, 1408 and 1410, a reference voltage modulator 1412, three summers 1414, 1416 and 1418 and a PWM generator 1420. As the label implies, reference voltage modulator 1412 generates three phase reference voltages Vur, Vvr and Vwr that are provided to summers 1414, 1416 and 1418, respectively. In addition, each of the reference voltages Vur, Vvr and Vwr are provided to compensation voltage processor 1404. Here, is assumed that the reference voltages Vur, Vvr and Vwr correspond to reference voltages that have already been modified to reduce the number of dv/dts that occur during each carrier cycle. Thus, for example, consistent with the embodiment of FIG. 8, a maximum reference voltage may have already been set equal to the minimum reference voltage.

Referring still to FIG. 31, carrier generator 1402, as the label implies, generates a carrier signal that is typically a high frequency triangle type carrier signal. The carrier signal is provided to compensation voltage processor 1404 as well as to PWM generator 1420. Each of switching devices 1406, 1408 and 1410 is similarly constructed and operates in a similar fashion and therefore, in the interest of simplifying this explanation, only device 1406 will be described here in detail. Device 1406 is a three input and single output switch where the inputs include compensation voltage values Vcom and −Vcom as well as a zero input. Switch 1406 is controlled by compensation voltage processor 1404 whereby one of the three inputs Vcom, −Vcom and zero is selected as an output for the switch 1406. The outputs of switches 1406, 1408 and 1410 are provided to summers 1414, 1416 and 1418, respectively. Summers 1414, 1416 and 1418 add or sum their inputs and provide compensated phase reference voltages Vurc, Vvrc and Vwrc, respectively, to generator 1420.

Referring still to FIG. 31, generator 1420 includes a duty cycle—on time converter 1422 and a PWM signal module 1424. Converter 1422 receives the compensated reference voltages and the carrier signal and uses those signals to generate three switch control signals G1, G3 and G5 which are provided to signal module 1424. Here, to generate signals G1, G3 and G5, converter 1422 operates in an active high mode with respect to the medium and minimum phase reference voltages and operates in an active low mode with respect to the maximum phase reference voltage in a manner consistent with that described above. Signal module 1424 uses the control signals G1, G3 and G5 to generate all six switch control signals G1 through G6 as illustrated. Although not illustrated, signals G1 through G6 are provided to a dead time compensator prior to driving an inverter or the like.

In operation, processor 1404 controls the other components shown to perform one of the processes described above with respect to FIGS. 28, 29 or 30.

While one embodiment is described above with respect to FIG. 31 for compensating for dead time effects, it should be appreciated that other embodiments are contemplated. For example, instead of modifying the reference voltages, Vur, Vvr and Vwr, in other embodiments, the output of the converter 1422 may be modified by simply shifting on and off times as appropriate in a manner consistent with that described above with respect to Table 3.

to One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for reducing common mode noise in a three phase pulse width modulated (PWM) system that includes a three phase waveform generator that generates first, second and third modulating waveforms, a carrier signal generator and a PWM generator that compares modulating waveforms and the carrier signal to generate switch control signals for controlling at least one of converter and inverter switches, the method comprising the steps of:
receiving the first, second and third modulating waveforms;
identifying one of the modulating waveforms that is at least one of instantaneously the maximum and instantaneously the minimum of the modulating waveforms as a first identified waveform, wherein comparison of the first identified waveform to the carrier signal would generate a first on-off pulse sequence associated with a phase corresponding to the first identified waveform;
generating switch control signals associated with the phase corresponding to the first identified waveform that cause a modified on-off pulse sequence that is phase shifted from the first pulse sequence;
using the second and third modulating waveforms to generate second and third on-off pulse sequences corresponding to second and third phases; and
providing the modified pulse sequence and the second and third pulse sequences to the one of the inverter and the converter.

2. The method of claim 1 wherein the first identified modulating waveform is one of instantaneously positive and negative, the step of generating switch control signals that cause a modified on-off pulse sequence including, when the first identified modulating waveform is positive, replacing the first identified modulating waveform with a negative waveform and, when the first identified modulating waveform is negative, replacing the first identified modulating waveform with a positive waveform.

3. The method of claim 2 wherein the step of generating switch control signals that cause a modified on-off pulse sequence further includes identifying the other of the instantaneously maximum and the instantaneously minimum waveform as a second identified waveform, the step of replacing the first identified modulating waveform including substituting the second identified waveform for the first identified waveform.

4. The method of claim 3 for use with a PWM generator that can be set up to be one of active high and active low wherein the PWM generator is initially set up to be one of active high and active low, the step of generating switch control signals that cause a modified on-off pulse sequence further including the step of, for the phase associated with the modified modulating waveform, changing the PWM generator set up from the initial one of active high and active low to the other of active high and active low and generating switch control signals using the reset generator and the modified modulating waveform.

5. The method of claim 4 wherein the initial one of active high and active low is active high.

6. The method of claim 4 wherein the first identified waveform is the instantaneous maximum waveform and the second identified waveform is the instantaneous minimum waveform.

7. The method of claim 4 wherein the first identified waveform is the instantaneous minimum waveform and the second identified waveform is the instantaneous maximum waveform.

8. The method of claim 2 wherein the step of replacing the first identified waveform includes inverting the first identified waveform and using the inverted waveform as the modified waveform.

9. The method of claim 8 wherein the step of generating switch control signals that cause a modified on-off pulse sequence further includes, after the modified waveform is used by the PWM generator to generate switch control signals, inverting the switch control signals associated with the modified waveform to generate modified switch control signals.

10. The method of claim 8 wherein the step of identifying a first identified waveform includes identifying the instantaneous maximum waveform.

11. The method of claim 8 wherein the step of identifying a first identified waveform includes identifying the instantaneous minimum waveform.

12. The method of claim 1 wherein the step of generating switch control signals corresponding to the first phase that cause a modified on-off pulse sequence that is phase shifted from the first pulse sequence includes using the first, second and third modulating waveforms to generate switch control signals and modifying at least a subset of the switch control signals associated with the first identified waveform.

13. The method of claim 12 for use with positive and negative DC links wherein the switch control signals generated by the PWM generator using the modulating waveforms include zero vectors V0 and V7 wherein all of the three phases are linked to the negative DC link and to the positive DC link by the switches, respectively, and wherein, the subset of switch control signals are modified to eliminate all instances of zero vectors V0 and V7.

14. The method of claim 13 wherein, whenever the zero vector V0 occurs and the modulating waveform for a specific one of the three phases is the maximum waveform, the switch control signals are altered for the phase to connect the phase to the positive DC link and whenever the zero vector V7 occurs and the modulating waveform for a specific one of the three phases is the maximum waveform, the switch control signals are altered for the phase to connect the phase to the negative DC link.

15. The method of claim 13 wherein, whenever the zero vector V0 occurs and the modulating waveform for a specific one of the three phases is the minimum waveform, the switch control signals are altered for the phase to connect the phase to the positive DC link and whenever the zero vector V7 occurs and the modulating waveform for a specific one of the three phases is the minimum waveform, the switch control signals are altered for the phase to connect the phase to the negative DC link.

16. A method for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V7 and V0 wherein each of the upper switches are on to link the three phases to the positive DC rail and where each of the lower switches are on to link the three phases to the negative DC rail, respectively, the method comprising the steps of:
receiving the first, second and third modulating waveforms;
identifying the instantaneous maximum modulating waveforms as a first identified waveform;
whenever the first, second and third modulating waveforms would result in a zero vector V0, generating switch control signals for a phase of the first phase, second phase and third phase associated with the first identified waveform to connect the phase of the first phase, second phase and third phase associated with the first identified waveform to the positive DC link; and
whenever the first, second and third modulating waveforms would result in a zero vector V7, generating switch control signals for a phase of the first phase, second phase and third phase associated with the first identified waveform to connect the phase of the first phase, second phase and third phase associated with the first identified waveform to the negative DC link.

17. A method for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V7 and V0 wherein each of the upper switches are on to link the three phases to the positive DC rail and where each of the lower switches are on to link the three phases to the negative DC rail, respectively, the method comprising the steps of:
receiving the first, second and third modulating waveforms;
identifying the instantaneous minimum modulating waveforms as a first identified waveform;
whenever the first, second and third modulating waveforms would result in a zero vector V0, generating switch control signals for a phase of the first phase, second phase and third phase associated with the first identified waveform to connect the phase of the first phase, second phase and third phase associated with the first identified waveform to the positive DC link; and
whenever the first, second and third modulating waveforms would result in a zero vector V7, generating switch control signals for a phase of the first phase, second phase and third phase associated with the first identified waveform to connect the phase of the first phase, second phase and third phase associated with the first identified waveform to the negative DC link.

18. An apparatus for reducing common mode noise in a three phase pulse width modulated (PWM) system that includes a three phase waveform generator that generates first, second and third modulating waveforms and at least one of a converter and an inverter, the apparatus comprising:
a processor that:
receives the first, second and third modulating waveforms;
identifies one of the modulating waveforms that is at least one of instantaneously the maximum and instantaneously the minimum of the modulating waveforms as a first identified waveform, wherein comparison of the first identified waveform to the carrier signal would generate a first on-off pulse sequence associated with a phase corresponding to the first identified waveform;
generates switch control signals associated with the phase corresponding to the first identified waveform that cause a modified on-off pulse sequence that is phase shifted from the first pulse sequence;
uses the second and third modulating waveforms to generate second and third on-off pulse sequences corresponding to the second and third phases; and
provides the modified pulse sequence and the second and third pulse sequences to the one of the inverter and the converter.

19. The apparatus of claim 18 wherein the first identified modulating waveform is one of instantaneously positive and negative, the processor performing the step of generating switch control signals that cause a modified on-off pulse sequence by, when the first identified modulating waveform is positive, replacing the first identified modulating waveform with a negative waveform and, when the first identified modulating waveform is negative, replacing the first identified modulating waveform with a positive waveform.

20. The apparatus of claim 19 wherein the processor performs the step of generating switch control signals that cause a modified on-off pulse sequence further includes the steps of identifying the other of the instantaneously maximum and the instantaneously minimum waveform as a second identified waveform, the step of replacing the first identified modulating waveform including substituting the second identified waveform for the first identified waveform.

21. The apparatus of claim 20 for use with a PWM generator that can be set up to be one of active high and active low wherein the PWM generator is initially set up to be one of active high and active low, the processor performing the step of generating switch control signals that cause a modified on-off pulse sequence further including the step of, for the phase associated with the modified modulating waveform, changing the PWM generator set up from the initial one of active high and active low to the other of active high and active low and generating switch control signals using the PWM generator and the modified modulating waveform.

22. The apparatus of claim 21 wherein the initial one of active high and active low is active high.

23. The apparatus of claim 21 wherein the first identified waveform is the instantaneous maximum waveform and the second identified waveform is the instantaneous minimum waveform.

24. The apparatus of claim 21 wherein the first identified waveform is the instantaneous minimum waveform and the second identified waveform is the instantaneous maximum waveform.

25. The apparatus of claim 19 wherein the processor is programmed to perform the step of replacing the first identified waveform by inverting the first identified waveform and using the inverted waveform as the modified waveform.

26. The apparatus of claim 25 wherein the processor performs the step of generating switch control signals that cause a modified on-off pulse sequence by further, after the modified waveform is used to generate switch control signals, inverting the switch control signals associated with the modified waveform to generate modified switch control signals.

27. The apparatus of claim 25 wherein the processor performs the step of identifying a first identified waveform by identifying the instantaneous maximum waveform.

28. The apparatus of claim 25 wherein the processor performs the step of identifying a first identified waveform by identifying the instantaneous minimum waveform.

29. The apparatus of claim 18 wherein the processor performs the step of generating switch control signals corresponding to the first phase by using the first, second and third modulating waveforms to generate switch control signals and modifying at least a subset of the switch control signals associated with the first identified waveform.

30. The apparatus of claim 29 for use with positive and negative DC links wherein the switch control signals generated by the PWM generator using the modulating waveforms include zero vectors V0 and V7 wherein all of the three phases are linked to the negative DC link and to the positive DC link by the switches, respectively, and wherein, the processor modifies the subset of switch control signals to eliminate all instances of zero vectors V0 and V7.

31. The apparatus of claim 30 wherein, whenever the zero vector V0 occurs and the modulating waveform for a specific one of the three phases is the maximum waveform, the processor alters the switch control signals for the phase to connect the phase to the positive DC link and whenever the zero vector V7 occurs and the modulating waveform for a specific one of the three phases is the maximum waveform, the processor alters the switch control signals for the phase to connect the phase to the negative DC link.

32. The apparatus of claim 30 wherein, whenever the zero vector V0 occurs and the modulating waveform for a specific one of the three phases is the minimum waveform, the processor alters the switch control signals for the phase to connect the phase to the positive DC link and whenever the zero vector V7 occurs and the modulating waveform for a specific one of the three phases is the minimum waveform, the processor alters the switch control signals for the phase to connect the phase to the negative DC link.

33. An apparatus for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V7 and V0 wherein each of the upper switches are on to link the three phases to the positive DC rail and where each of the lower switches are on to link the three phases to the negative DC rail, respectively, the apparatus comprising:

a processor that:

receives the first, second and third modulating waveforms;

identifies the instantaneous maximum modulating waveforms as a first identified waveform; and whenever the first, second and third modulating waveforms would result in a zero vector V0, generates switch control signals for a phase of the first phase, second phase and third phase associated with the first identified waveform to connect the phase of the first phase, second phase and third phase associated with the first identified waveform to the positive DC link; and whenever the first, second and third modulating waveforms would result in a zero vector V7, generates switch control signals for a phase of the first phase, second phase and third phase associated with the first identified waveform to connect the phase of the first phase, second phase and third phase associated with the first identified waveform to the negative DC link.

34. An apparatus for reducing common mode noise in a three phase pulse width modulated (PWM) system that includes positive and negative DC links, at least one of a converter and an inverter that includes first, second and third upper switching devices that link each of the first, second and third phases to the positive DC link and first, second and third lower switching devices that link each of the first, second and third phases to the negative DC link, respectively, a three phase waveform generator that generates first, second and third modulating waveforms, a carrier signal generator and a PWM generator that compares modulating waveforms and the carrier signal to generate switch control signals for controlling at least one of the converter and inverter switches, the switch control signals periodically commanding zero vectors V7 and V0 wherein each of the upper switches are on to link the three phases to the positive DC rail and where each of the lower switches are on to link the three phases to the negative DC rail, respectively, the apparatus comprising:

a processor that:
receives the first, second and third modulating waveforms;
identifies the instantaneous minimum modulating waveforms as a first identified waveform; and
whenever the first, second and third modulating waveforms would result in a zero vector V0, generates switch control signals for a phase of the first phase, second phase and third phase associated with the first identified waveform to connect the phase of the first phase, second phase and third phase associated with the first identified waveform to the positive DC link; and
whenever the first, second and third modulating waveforms would result in a zero vector V7, generates switch control signals for a phase of the first phase, second phase and third phase associated with the first identified waveform to connect the phase of the first phase, second phase and third phase associated with the first identified waveform to the negative DC link.

35. An apparatus for reducing common mode noise in a three phase pulse width modulated (PWM) system that includes at least one of a converter and an inverter that includes first, second and third upper switching devices and first, second and third lower switching devices, a three phase waveform generator that generates first, second and third modulating waveforms and a PWM generator that uses the modulating waveforms to generate switch control signals for controlling the upper and lower switches, the PWM system operating in a first sector when the first modulating waveform is maximum and the third modulating waveform is minimum, operating in a second sector when the second modulating waveform is maximum and the third modulating waveform is minimum, operating in a third sector when the second modulating waveform is maximum and the first modulating waveform is minimum, operating in a fourth sector when the third modulating waveform is maximum and the first modulating waveform is minimum, operating in a fifth sector when the third modulating waveform is maximum and the second modulating waveform is minimum and operating in a sixth sector when the first modulating waveform is maximum and the second modulating waveform is minimum, the apparatus comprising:
a processor that:
receives the first, second and third modulating waveforms;
identifies an instantaneous operating sector;
generates initial control signals by comparing the modulating waveforms to the carrier signal;
modifies the control signals as a function of the instantaneous operating sector to generate modified control signals; and
uses the modified carrier signals to control the one of the inverter and the converter.

36. The assembly of claim 35 wherein Q2, Q1 and Q0 represent switching states of switching devices associated with first, second and third phases of the one of a converter and an inverter, respectively, wherein a "1" value indicates that an upper switching device associated with the phase is on while a lower switching device associated with the phase is off and a "0" value indicates that an upper switching device associated with the phase is off while a lower switching device associated with the phase is on, the step of modifying the control signals includes setting values Q2, Q1 and Q0 equal to 001, 010, 011, 100, 101 and 110 when instantaneous operation is in the first, second, third, fourth, fifth and sixth sectors, respectively and solving a set of equations as a function of control signal values for the upper switching devices and the values Q2, Q1 and Q0.

37. The assembly of claim 36 wherein the step of solving a set of equations includes solving the following equations:

$$G_1' = G_1\overline{G_3} + G_1 G_3 \overline{G_5} + \overline{G_1 G_3 G_5}(\overline{Q_2 Q_1}Q_0 + Q_2 Q_1 \overline{Q_0}) + G_1 G_3 G_5(\overline{Q_2 Q_1} + Q_2 \overline{Q_1})$$

$$G_3' = \overline{G_1}G_3 + G_1 G_3 \overline{G_5} + \overline{G_1 G_3 G_5}(\overline{Q_2}Q_1) + G_1 G_3 G_5(\overline{Q_2 Q_1}Q_0 + Q_2 \overline{Q_1} + Q_2 Q_1 \overline{Q_0})$$

$$G_5' = \overline{G_1 G_3}G_5 + \overline{G_1}G_3 G_5 + G_1 \overline{G_3}G_5 + \overline{G_1 G_3 G_5}(Q_2 \overline{Q_1}) + G_1 G_3 G_5(\overline{Q_2}Q_0 + Q_1 \overline{Q_0})$$

where G1, G3 and G5 are initial upper switch device control signals and G1', G3' and G5' are modified upper switch device control signals.

38. The assembly of claim 36 wherein the step of solving a set of equations includes solving the following equations:

$$G_3' = \overline{G_1}G_3 + G_1 G_3 \overline{G_5} + \overline{G_1 G_3 G_5}(Q_2 \overline{Q_1}Q_0 + Q_2 Q_1 \overline{Q_0}) + G_1 G_3 G_5(\overline{Q_2 Q_1}Q_0 + \overline{Q_2}Q_1 + Q_2 \overline{Q_1 Q_0})$$

$$G_5' = \overline{G_1 G_3}G_5 + \overline{G_1}G_3 G_5 + G_1 \overline{G_3}G_5 + \overline{G_1 G_3 G_5}(\overline{Q_2 Q_1}Q_0 + \overline{Q_2}Q_1 \overline{Q_0}) + G_1 G_3 G_5(\overline{Q_2}Q_1 Q_0 + Q_2 \overline{Q_1} + Q_2 Q_1 \overline{Q_0})$$

$$G_1' = G_1\overline{G_3} + G_1 G_3 \overline{G_5} + \overline{G_1 G_3 G_5}(\overline{Q_2}Q_1 Q_0 + Q_2 \overline{Q_1 Q_0}) + G_1 G_3 G_5(\overline{Q_1}Q_0 + Q_1 \overline{Q_0})$$

where G1, G3 and G5 are initial upper switch device control signals and G1', G3' and G5' are modified upper switch device control signals.

* * * * *

UNITED STATES PATENT AND TRADEMARK OFFICE
CERTIFICATE OF CORRECTION

PATENT NO. : 7,649,756 B2
APPLICATION NO. : 11/435651
DATED : January 19, 2010
INVENTOR(S) : Kerkman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-third Day of November, 2010

David J. Kappos
*Director of the United States Patent and Trademark Office*